United States Patent
Handelman

(10) Patent No.: US 7,162,155 B2
(45) Date of Patent: Jan. 9, 2007

(54) OPTICAL PACKET SWITCHING APPARATUS AND METHODS

(76) Inventor: Doron Handelman, 14 Hamaavak Street, Givatayim (IL) 53520

( * ) Notice: Subject to any disclaimer, the term of this patent is extended or adjusted under 35 U.S.C. 154(b) by 892 days.

(21) Appl. No.: 10/057,991

(22) Filed: Jan. 29, 2002

(65) Prior Publication Data

US 2003/0043430 A1    Mar. 6, 2003

Related U.S. Application Data

(63) Continuation-in-part of application No. 09/944,603, filed on Sep. 4, 2001, now Pat. No. 7,106,967.

(51) Int. Cl.
 *H04J 14/00* (2006.01)
 *H04J 1/16* (2006.01)
 *G01R 31/08* (2006.01)
 *G06F 11/00* (2006.01)
 *G08C 15/00* (2006.01)

(52) U.S. Cl. ............................. 398/51; 398/54; 398/57; 398/47; 370/235

(58) Field of Classification Search ................. 398/51, 398/54, 47, 57; 370/229–232, 235
See application file for complete search history.

(56) References Cited

U.S. PATENT DOCUMENTS

| | | | |
|---|---|---|---|
| 4,626,075 A | 12/1986 | Chemla | |
| 4,726,010 A | 2/1988 | Ali et al. | |
| 5,170,273 A | 12/1992 | Nishio | |
| 5,191,457 A | 3/1993 | Yamazaki | |
| 5,194,977 A | 3/1993 | Nishio | |
| 5,319,484 A | 6/1994 | Jacob et al. | |
| 5,325,222 A | 6/1994 | Jacob et al. | |
| 5,400,322 A | 3/1995 | Hunt et al. | |
| 5,416,625 A | 5/1995 | Cavaciuti et al. | |
| 5,452,115 A | 9/1995 | Tomioka | |
| 5,457,687 A | 10/1995 | Newman | |
| 5,479,447 A | 12/1995 | Chow et al. | |
| 5,557,439 A | 9/1996 | Alexander et al. | |
| 5,680,490 A | 10/1997 | Cohen et al. | |
| 5,712,932 A | 1/1998 | Alexander et al. | |
| 5,724,167 A | 3/1998 | Sabella | |

(Continued)

FOREIGN PATENT DOCUMENTS

CA    2353791    1/2002

(Continued)

OTHER PUBLICATIONS

"The wavelength dilation concept in lightwave networks-implementation and system considerations": Sharony et al.; Lightwave Technology, Journal of; Vo 11, Issue 5, May-Jun. 1993; pp: 900-907.*

(Continued)

*Primary Examiner*—Jason Chan
*Assistant Examiner*—Nathan Curs

(57) ABSTRACT

In an optical packet switch, NW wavelengths, over which inputted optical packets may be switched, are grouped into KG groups of wavelengths, where NW and KG are integers greater than one. The KG groups of wavelengths are characterized in that each of the KG groups of wavelengths is allocated to optical packets distinguished from other optical packets by at least one attribute of at least one packet characteristic. Each one inputted optical packet is switched over a wavelength having an available transmission resource selected from among wavelengths in one of the KG groups of wavelengths that is matched to the one inputted optical packet by correspondence of attributes of the at least one packet characteristic. Related apparatus and methods are also described.

21 Claims, 5 Drawing Sheets

U.S. PATENT DOCUMENTS

| | | | |
|---|---|---|---|
| 5,739,935 | A | 4/1998 | Sabella |
| 5,774,244 | A | 6/1998 | Tandon et al. |
| 5,867,289 | A | 2/1999 | Gertsel |
| 5,953,138 | A | 9/1999 | Ellis |
| 6,023,360 | A | 2/2000 | Morioka et al. |
| 6,108,112 | A | 8/2000 | Touma |
| 6,204,944 | B1 | 3/2001 | Uchiyama et al. |
| 6,233,082 | B1 | 5/2001 | Johnson |
| 6,288,808 | B1* | 9/2001 | Lee et al. ..................... 398/49 |
| 6,314,115 | B1 | 11/2001 | Delfyett et al. |
| 6,404,522 | B1 | 6/2002 | Handelman |
| 6,574,018 | B1 | 6/2003 | Handelman |
| 6,763,191 | B1 | 7/2004 | Handelman |
| 6,892,032 | B1* | 5/2005 | Milton et al. ................. 398/79 |
| 2002/0048067 | A1 | 4/2002 | Handelman et al. |
| 2003/0156841 | A1 | 8/2003 | Chraplyvy et al. |

FOREIGN PATENT DOCUMENTS

| | | |
|---|---|---|
| IL | 124639 | 9/2001 |
| WO | WO 01/37599 A | 5/2001 |

OTHER PUBLICATIONS

Peng et al., "Distributed wavelength assignment protocols with priority for WDM all-optical networks"; Ninth International Conference on Computer Communications and Networks, 2000; Oct. 16-18, 2000: pp. 625-630.*

Karalopoulos, "Introduction to DWDM Technology", IEEE Press, 2000; pp. 56-57.*

Mining the Optical Bandwidth for a Terabit per second, Alan Wilner, IEEE Spectrum, Apr. 1997, pp. 32-41.

Record Data-Transmission Rate Reported at ECOC '96, Laser Focus World, Nov. 1996, pp. 40-42.

Multiple Wavelengths Exploit Fiber Capacity, Eric Lerner, Laser Focus World, Jul. 1997, pp. 119-125.

Advances in Dense WDM push diode-laser design, Diana Zankowsky, Laser Focus World, Aug. 1997, pp. 167-171.

Multistage Amplifier Provides Gain across 80 nm, pp. 22-23.

Optical Switching Promises cure for telecommunications logjam, Jeff Hecht, Laser Focus World, Sep. 1998, pp. 69-72.

The Communications Handbook, Jeffrey Gibson, 1997, pp. 883-890.

WDM Local Area Networks, Kazovsky et al., IEEE LTS, May 1992, pp. 8-15.

Optical Switches Ease Bandwidth Crunch, Europhotonics, Rien Flipse, Aug./Sep. 1998, pp. 44-45.

Speed Demons: Is 'Faster' Better and Cheaper? Stephanie Weiss, Photonics Spectra, Feb. 1999, pp. 96-102.

Wavelength Lockers Keep Lasers in Line, Ed Miskovic, Photonics Spectrra, Feb. 1999, pp. 104-110.

Optical Switches Pursue Crossconnect Markets, Hassaun Jones-Bey, Laser Focus World, May 1998, pp. 153-162.

Demand Triggers Advances in Dense WDM Components, Raymond Nering, Optoelectronics World, Sep. 1998, pp. S5-S8.

Optical Networks, Hector Escobar, Photonics Spectra, Dec. 1998, pp. 163-167.

Ultrafast Optical Switch Unveiled, Photonics Spectra, Michael Wheeler, Dec. 1998, p. 42.

Data Express, Gigabit Junction with the Next-Generation Internet, John Collins et al, IEEE Spectrum, Feb. 1999, pp. 18-25.

Designing Broaband Fiber Optic Communications Systems, Juan Lam, Communication Systems Design, Feb. 1999.

Terabit-Transmission Demonstrations make a splash at OFC '96, Laser Focus World, Apr. 1996, p. 13.

Multigigabit Networks: The Challenge, Claude Rolland et al., IEEE LTD, May 1992, pp. 16-26.

Dirct Detection Lightwave Systems: Why Pay More? Paul Green et al., IEEE LCS, Nov. 1990, pp. 36-49.

Photonics in Switching, Scott Hinton, IEEE LTD, Aug. 1992. pp. 26-35.

Advanced Technology for Fiber Optic Subscriber Systems, Hiromu Taba et al., IEEE LTS, Nov. 1992, pp. 12-18.

Fiber Amplifiers Expand Network Capacities, Eric Lerner, Laser Focus World, Aug. 1997, pp. 85-96.

Technologies for Local-Access Fibering, Yukou Mochida, IEEE Communications Magazine, Feb. 1994, pp. 64-72.

Wavelength Assignment is Multiphop Lightwave Networks, Aura Ganz et al., IEEE Transactions on Communications, vol. 42, No. 7, Jul. 1994, pp. 2460-2469.

Wavelength-Division Switching Technology in Photonic Switching Systems, Suzuki et al., IEEE International Conference on Communications, ICC 1990, pp. 1125-1129.

Branch-Exchange Sequences for Reconfiguration of Lightwave Networks, Labourdette et al., IEEE Transactions on Communications, vol. 42, No. 10, Oct. 1994, pp. 2822-2832.

Use of Delegated Tuning and Forwarding in Wavelength Division Multiple Access Networks, Auerbach et al., IEEE Transcations on Communications, vol. 43, No. 1, Jan. 1995, pp. 52-63.

Design and Cost Performance of the Multistage WDN-PON Access Network, Guido Maier et al., Journal of Lightwave Technology, vol. 18, No. 2, Feb. 2000, pp. 125-143.

Polarization Insensitive Widely Tunable All-Optical Clock Recovery Based on AM Mode-Locking of a Fiber Ring Laser, IEEE Photonics Technology Letters, vol. 12, No. 2, Feb. 2000, pp. 211-213.

Ultra-High-Speed PLL-Type Clock Recovery Circuit Based on All-Optical Gain Modulation in Traveling-Wave Laser Diode Amplifier, Journal of Lightwave Technology, vol. 11, No. 12, Dec. 1993, pp. 2123-2129.

All-Optical Networks Need Optical Switches, Jeff Hecht, Laser Focus World, May 2000, pp. 189-196.

Photons at Work: Optical Networks on the Rise, Lee Goldberg, Electronic Design, Mar. 22, 1999, pp. 56-66.

Asynchronous Time Division Switching, Achille Pattavina, IEEE Communication Handbook, 1997, pp. 686-700.

Multiple Access Methods for Communications Networks, Izhak Rubin, IEEE Communications Handbook, 1997, pp. 622-649.

Combining Gratings and Filters Redues WDM Channel Spacing, Pan and Shi, OptoElectronics World, Sep. 1998, pp. S11-S17.

Picosecond-Accuracy All-Optical Bit Phase Sensing Using a Nonlinear Optical Loop Mirror, Hall et al., IEEE Photonics Technology Letters, vol. 7, No. 8, Aug. 1995, pp. 935-937.

An Ultrafast Variable Optical Delay Technique, Hall et al., IEEE Photonics Technology Letters, vol. 12, No. 2, Feb. 2000, pp. 208-210.

Prescaled 6.3 GHz clock recovery from 50 Gbit/s TDM Optical Signal with 50 GHz PLL using four-wave mixing in a travelling wave laser diode optical amplifier, Electronics Letters, May 12, 1994, vol. 30, No. 10, pp. 807-809.

Variable Optical delay line with diffraction limited Autoalignment, Klovekorn and Munch, Applied Optics, Apr. 1, 1998, vol. 37, No. 10, pp. 1903-1904.

Compact 40 Gbit/s Optical Demultiplexer using a GaInAsP Optical Amplifier, Electronics Letters, Nov. 25, 1993, vol. 29, No. 24, pp. 2115-2116.

Lucent Upgrades WaveStar to 320-Channel, 800-Gb/s Transmission; Chalmers Develops 49-dB Optical Parametric Amplifier, Photonics Spectra, Jun. 2000, p. 46.

Bit-Rate Flexible All-Optical Demultiplexing Using a Nonlinear Optical Loop Mirror, Patrick et al., Electronics Letters, Apr. 15, 1993, vol. 29, No. 8, pp. 702-703.

All-Optical High Speed Dumultiplexing with a Semiconductor Laser Amplifier in a Loop Mirror Configuration, Eiselt et al., Electronics Letters, Jun. 24, 1993, vol. 29, No. 13, pp. 1167-1168.

Optical Amplifiers Revolutionize Communications, Laser Focus World, Sep. 1998, pp. 28-32.

Single Interferometer Demplitiplexes 40 Gbit/s Optical-Time-Division-Multiplexed Signal, Laser Focus World, Nov. 1999, p. 11.

Fiber-Optic Chips Multiplex 16 T1/E1 Channels Over One Cable, Electronic Design, Apr. 17, 2000, pp. 46.

Analysis and Dimensioning of Switchless Networks for Single-Layer Optical Architecture, Binetti et al., Journal of Lightwave Technology, vol. 18,. No. 2, Feb. 2000, pp. 144-153.

100-Gbit/s Bitwise Logic, Hall et al., MIT Lincoln Laboratory, Optics Letters, vol. 23, No. 16, Aug. 15, 1998, pp. 1271-1273.

An Optical Technique for Bit and Packet Synchronization, Blixt and Bowers, IEEE Photonics Technology Letters, vol. 7, No. 1, Jan. 1995, pp. 123-125.

Double-Spreading Modulation Scheme Picks up Where CDMA and TDMA Leave Off, Electronics Designs, Jul. 10, 2000, pp. 28-32.

Transmission of a True Single Polarisation 40 Gbit/s Soliton Data Signal Over 205km Using a Stabilised Erbium Fibre Ring Laser and 40 GHz Electronic Timing Recovery, Ellis et al., Electronic Letters, vol. 29, No. 11, May 27, 1993, pp. 990-992.

Time-Stretch Methods Capture Fast Waveforms, Jalali et al., Microwaves & RF, Apr. 1999, pp. 62-69.

The Fiber-Optic Subscriber Network in Japan, Wakui, IEEE Communications Magazine, Feb. 1994, pp. 56-63.

A Justification for a Variable Bandwidth Allocation Methodology for SONET Virtually Concatenated SPEs, Nevin Jones and Trevor Wilson, Lucent Technologies, Jul. 10-14, 2000.

Higher Order SONET Virtual Concatenation, Nevin Jones, Paul Langner and Charles Webb, Lucent Technologiies, Apr. 9, 1999.

The Communications Handbook, 1997, Chapter 39, pp. 542-553.

The Communications Handbook, 1997, Chapter 40, pp. 554-564.

Architectural and Technological Issues for Future Optical Internet Networks, Listanti, et al., IEEE Communications Magazine, Sep. 2000, pp. 82-92.

IP Over Optical Networks: Architectural Aspects, Rajagopalan, et al., IEEE Communications Magazine, Sep. 2000, pp. 94-102.

Labeled Optical Burst Switching for IP-over-WDM Integration, Chunming Qiao, IEEE Communications Magazine, Sep. 2000, pp. 104-114.

Approaches to Optical Internet Packet Switching, Hunter, et al., IEEE Communications Magazine, Sep. 2000, pp. 116-122.

Photonic Switches: Fast, but Functional? McCarthy, Photonics Spectra, Mar. 2001, pp. 140-150.

The Communications Handbook, Gibson, A CRC Handbook Published in Cooperation with IEEE Press, 1997 CRC Press, Inc., pp. 513-528.

A Proposed Link Capacity Adjustment Scheme (LCAS) for SONET Virtually Concatenated SPEs, Jones, et al., Lucent Technologies, T1X1.5/200-199, pp. 1-30.

Fiber-based components meets the needs of next-generation amplifiers, Bourgeois, WDM Solutions, Mar. 2001, pp. 67-74 www.optoelectronics-world.com.

Spectral Equalization Keeps Optical Signals in Line, Ashmead, WDM Solutions, Jan. 2001, pp. 32-38 www.optoelectronics-world.com.

Keep Your Photons in Line, Wesson et al., Photonics Spectra, Sep. 1999, pp. 102-108.

Router Promises Faster Switching, Robinson, Photonics Technology World, Photonics Spectra, Aug. 2001, p. 24.

On a Dynamic Wavelength Assignment Algorithm for Wavelength Routed All-Optical Networks, Andrei G. Stoica, et al., Optical Networks Magazine, Jan./Feb. 2002, pp. 68-80.

XOR: A Logical Choice of All-Optical Networks, Perry J. Greenbaum, IEEE Photonics Technology Letters, vol. 13, Jul. 2001, pp. 750-752, Photonics Spectra, Nov. 2001, pp. 30 and 31.

On Adaptive Routing in Wavelength-Routed Networks, Ching-Fang Hsu, et al., Optical Networks Magazine, Jan./Feb. 2002, pp. 15-24.

A Comparative Study of Distributed Protocols for Wavelength Reservation in WDM Optical Networks, Debashis Saha, Optical Networks Magazine, Jan./Feb. 2002, pp. 45 52.

A Framework for Unified Traffic Engineering in IP over WDM Networks, Jinhan Song, et al., Optical Networks Magazine, Nov./Dec. 2001, pp. 28-33.

Optimization of Wavelength Allocation in WDM Optical Buffers, Franco Callegati, Optical Networks Magazine, Nov./Dec. 2001, pp. 66-72.

A Simple Dynamic Integrated Provisioning/Protection Scheme in IP over WDM Networks, Yinghua Ye, et al., IEEE Communications Magazine, Nov. 2001, pp. 174-182.

Photonic Packet Switching and Optical Label Swapping, Daniel J. Blumenthal, Optical Networks Magazine, Nov./Dec. 2001, pp. 54-65.

Intelligent Optical Networking for Multilayer Survivability, Sophie de Maesschalck, et al., IEEE Communications Magazine, Jan. 2002, pp. 42-49.

Variable optical delay circuit using wavelength converters, T. Sakamoto et al, Electronics Letters, vol. 37, No. 7, Mar. 29, 2001, pp. 454-455.

\* cited by examiner

OPTICAL PACKET SWITCHING APPARATUS AND METHODS

CROSS-REFERENCE TO RELATED APPLICATIONS

This application is a continuation-in-part of U.S. patent application Ser. No. 09/944,603 filed Sep. 4, 2001, now U.S. Pat. No. 7,106,967, the disclosure of which is hereby incorporated herein by reference.

FIELD OF THE INVENTION

The present invention relates generally to optical communication networks, and more particularly to optical packet switching in optical communication networks.

BACKGROUND OF THE INVENTION

The rapid growth of data communications and the deployment of optical communication systems that utilize wavelength division multiplexing (WDM) created a demand for new switching methods. Optical packet switching is considered today a switching method that is particularly suitable for data communications based on the Internet Protocol (IP) and for optical communication systems that utilize WDM.

There are two main techniques for implementing optical packet switching. The two techniques mainly differ in structure of optical packets used thereby, and in switching node operation modes that result from the different structures of the optical packets. The first technique employs fixed-length packets and a synchronous mode of operation of switching nodes, and the second technique employs variable-length packets and an asynchronous mode of operation of switching nodes. Asynchronous variable-length packets are also referred to as bursts and the second technique is therefore also referred to as optical burst switching (OBS).

Basic aspects of the foregoing techniques of optical packet switching are described in the following publications:

an article entitled "Architectural and Technological Issues for Future Optical Internet Networks", by Listanti et al in *IEEE Communications Magazine*, September 2000, pages 82–92;

an article entitled "IP Over Optical Networks: Architectural Aspects", by Rajagopalan et al in *IEEE Communications Magazine*, September 2000, pages 94–102;

an article entitled "Labeled Optical Burst Switching for IP-over-WDM Integration", by Chunming Qiao in *IEEE Communications Magazine*, September 2000, pages 104–114; and an article entitled "Approaches to Optical Internet Packet Switching", by Hunter et al in *IEEE Communications Magazine*, September 2000, pages 116–122.

Both techniques of optical packet switching mentioned above require careful traffic engineering in order to enable efficient transmission of optical packets and efficient utilization of wavelength resources.

State-of-the-art traffic engineering techniques attempt to optimize allocation of wavelengths to incoming optical packets in order to utilize each wavelength that carries optical packets with as little as possible gaps between adjacent optical packets, and to reduce congestion and loss of packets. Therefore, sophisticated wavelength selection and packet scheduling algorithms have been proposed for determining, for each incoming optical packet, a carrier wavelength from among N wavelengths that is most suitable in terms of availability and gap filling, where N is an integer greater than one. Such traffic engineering techniques are described in the following publications:

an article entitled "A framework for unified traffic engineering in IP over WDM networks", by Song et al in *Optical Networks Magazine*, November/December 2001, pages 28–33; and an article entitled "Optimization of wavelength allocation in WDM optical buffers", by Callegati et al in *Optical Networks Magazine*, November/December 2001, pages 66–72.

However, as optical switches become more complex with more wavelengths used thereby, N increases thereby increasing computation complexity of prior art traffic engineering algorithms which results in a demand for more powerful and more expensive computation resources. Additionally, since the prior art algorithms do not distinguish among optical packets having different attributes of packet characteristics, undesired events may occur, such as events in which delay insensitive optical packets are switched before delay sensitive optical packets thereby delaying transmission of the delay sensitive optical packets. Therefore, techniques that can reduce computation complexity and prevent problems encountered with switching of optical packets having different attributes of packet characteristics may be highly desired.

Some aspects of technologies and related art that may be useful in understanding the present invention are described in the following publications:

an article entitled "Mining the Optical Bandwidth for a Terabit per Second", by Alan Eli Willner in *IEEE Spectrum*, April 1997, pages 32–41;

an article entitled "Polarization Insensitive Widely Tunable All-Optical Clock Recovery Based on AM Mode-Locking of a Fiber Ring Laser", by Wang et al in *IEEE Photonics Technology Letters*, Vol. 12, No. 2, February 2000, pages 211–213;

an article entitled "Ultra-High-Speed PLL-Type Clock Recovery Circuit Based on All-Optical Gain Modulation in Traveling-Wave Laser Diode Amplifier", by Kawanishi et al in *Journal of Lightwave Technology*, Vol. 11, No. 12, December 1993, pages 2123–2129;

an article entitled "Prescaled 6.3 GHz clock recovery from 50 GBit/s TDM optical signal with 50 GHz PLL using four-wave mixing in a traveling-wave laser diode optical amplifier", by Kamatani et al in *Electronics Letters*, Vol. 30, No. 10, May 12, 1994, pages 807–809;

an article entitled "Variable optical delay line with diffraction-limited autoalignment" by Klovekorn et al in *Applied Optics*, Vol. 37, No. 10, Apr. 1, 1998, pages 1903–1904;

an article entitled "Picosecond-Accuracy All-Optical Bit Phase Sensing Using a Nonlinear Optical Loop Mirror", by Hall et al in *IEEE Photonics Technology Letters*, Vol. 7, No. 8, August 1995, pages 935–937;

an article entitled "An Ultrafast Variable Optical Delay Technique", by Hall et al in *IEEE Photonics Technology Letters*, Vol. 12, No. 2, February 2000, pages 208–210;

an article entitled "Optical switching promises cure for telecommunications logjam", by Jeff Hecht in *Laser Focus World*, September 1998, pages 69–72;

an article entitled "Design and Cost Performance of the Multistage WDM-PON Access Networks", by Maier et al in *Journal of Lightwave Technology*, Vol. 18, No. 2, February 2000, pages 125–143;

an article entitled "All-optical networks need optical switches", by Jeff Hecht in *Laser Focus World*, May 2000, pages 189–196;

a technology brief entitled "Lucent Upgrades Wavestar to 320-Channel, 800-Gb/s Transmission", in *Photonics Spectra*, June 2000, page 46;

an article entitled "Record Data Transmission Rate Reported at ECOC 96", by Paul Mortensen in *Laser Focus World*, November 1996, pages 40–42;

an article entitled "Multiple Wavelengths Exploit Fiber Capacity", by Eric J. Lerner in *Laser Focus World*, July 1997, pages 119–125;

an article entitled "Advances in Dense WDM Push Diode-Laser Design", by Diana Zankowsky in *Laser Focus World*, August 1997, pages 167–172;

an article entitled "Multistage Amplifier Provides Gain Across 80 nm", by Kristin Lewotesky in *Laser Focus World*, September 1997, pages 22–24;

an article entitled "WDM Local Area Networks", by Kazovsky et al in *IEEE LTS*, May 1992, pages 8–15;

an article entitled "Optical Switches Ease Bandwidth Crunch", by Rien Flipse in *EuroPhotonics*, August/September 1998, pages 44–45;

an article entitled "Speed Demons: Is 'Faster' Better and Cheaper?", by Stephanie A. Weiss in *Photonics Spectra*, February 1999, pages 96–102;

an article entitled "Wavelength Lockers Keeps Laser in Line", by Ed Miskovic in *Photonics Spectra*, February 1999, pages 104–110;

an article entitled "Optical switches pursue crossconnect markets", by Hassaun Jones-Bay in *Laser Focus World*, May 1998, pages 153–162;

a conference review entitled "Optical amplifiers revolutionize communications", by Gary T. Forrest in *Laser Focus World*, September 1998, pages 28–32;

an article entitled "Combining gratings and filters reduces WDM channel spacing", by Pan et al in *Optoelectronics World*, September 1998, pages S11–S17;

an article entitled "Demand triggers advances in dense WDM components", by Raymond Nering in *Optoelectronics World*, September 1998, pages S5–S8;

an article entitled "Optical Networks Seek Reconfigurable Add/Drop Options", by Hector E. Escobar in *Photonics Spectra*, December 1998, pages 163–167;

an article entitled "Ultrafast Optical Switch Unveiled", by Michael D. Wheeler in *Photonics Spectra*, December 1998, page 42, an article entitled "Data express Gigabit junction with the next-generation Internet", by Collins et al in *IEEE Spectrum*, February 1999, pages 18–25;

an article entitled "Designing Broadband Fiber Optic Communication Systems", by Juan F. Lam in *Communication Systems Design* magazine, February 1999, pages 1–4 at http://www.csdmag.com;

an article entitled "Terabit/second-transmission demonstrations make a splash at OFC '96", in *Laser Focus World*, April 1996, page 13;

an article entitled "Multigigabit Networks: The Challenge", by Rolland et al in *IEEE LTS*, May 1992, pages 16–26;

an article entitled "Direct Detection Lightwave Systems: Why Pay More?", by Green et al in *IEEE LCS*, November 1990, pages 36–49;

an article entitled "Photonics in Switching", by H. Scott Hinton in *IEEE LTS*, August 1992, pages 26–35;

an article entitled "Advanced Technology for Fiber Optic Subscriber Systems", by Toba et al in *IEEE LTS*, November 1992, pages 12–18;

an article entitled "Fiber amplifiers expand network capacities", by Eric J. Lerner in *Laser Focus World*, August 1997, pages 85–96;

an article entitled "Technologies for Local-Access Fibering", by Yukou Mochida in *IEEE Communications Magazine*, February 1994, pages 64–73;

an article entitled "Wavelength Assignment in Multihop Lightwave Networks", by Ganz et al in *IEEE Transactions on Communications*, Vol. 42, No. 7, July 1994, pages 2460–2469;

an article entitled "Wavelength-Division Switching Technology in Photonic Switching Systems", by Suzuki et al in IEEE International Conference on Communications ICC '90, pages 1125–1129;

an article entitled "Branch-Exchange Sequences for Reconfiguration of Lightwave Networks", by Labourdette et al in *IEEE Transactions on Communications*, Vol. 42, No. 10, October 1994, pages 2822–2832;

an article entitled "Use of Delegated Tuning and Forwarding in Wavelength Division Multiple Access Networks", by Auerbach et al in *IEEE Transactions on Communications*, Vol. 43, No. 1, January 1995, pages 52–63;

an article entitled "Compact 40 Gbit/s optical demultiplexer using a GaInAsP optical amplifier", by Ellis et al in *Electronics Letters*, Vol. 29, No. 24, Nov. 25, 1993, pages 2115–2116;

an article entitled "Bit-Rate Flexible All-Optical Demultiplexing Using a Nonlinear Optical Loop Mirror", by Patrick et al in *Electronics Letters*, Vol. 29, No. 8, Apr. 15, 1993, pages 702–703;

an article entitled "All-Optical High Speed Demultiplexing with a Semiconductor Laser Amplifier in a loop Mirror Configuration", by Eiselt et al in *Electronics Letters*, Vol. 29, No. 13, Jun. 24, 1993, pages 1167–1168;

an article entitled "Photonic Switches: Fast, but Functional?", by Daniel C. McCarthy in *Photonics Spectra*, March 2001, pages 140–150;

an article entitled "Photonic packet switching and optical label swapping", by Daniel J. Blumenthal in *Optical Networks Magazine*, November/December 2001, pages 54–65;

an article entitled "A Simple Dynamic Integrated Provisioning/Protection Scheme in IP Over WDM Networks", by Ye et al in *IEEE Communications Magazine*, November 2001, pages 174–182;

an article entitled "XOR: A Logical Choice for All-Optical Networks", by Perry J. Greenbaum in *Photonics Spectra*, November 2001, pages 30–31;

U.S. Pat. No. 5,170,273 to Nishio which describes a cross-talk reducing optical switching system which receives electrical digital signals at its input terminal;

U.S. Pat. No. 5,191,457 to Yamazaki that describes a WDM optical communication network in which optical beams are modulated by channel discrimination signals of different frequencies;

U.S. Pat. No. 5,194,977 to Nishio that describes a wavelength division switching system with reduced optical components using optical switches;

U.S. Pat. No. 5,557,439 to Alexander et al. that describes wavelength division multiplexed optical communication systems configured for expansion with additional optical signal channels;

U.S. Pat. No. 5,680,490 to Cohen et al. that describes a comb splitting system which demultiplexes and/or multiplexes a plurality of optical signal channels at various wavelengths;

U.S. Pat. No. 5,712,932 to Alexander et al. that describes reconfigurable wavelength division multiplexed systems which include configurable optical routing systems;

U.S. Pat. Nos. 5,724,167 and 5,739,935 to Sabella that describe an optical cross-connect node architecture that interfaces plural optical fiber input and output links, each link containing plural wavelength channels;

U.S. Pat. No. 5,457,687 to Newman that describes reactive congestion control in an ATM network where the network is formed by the interconnection of nodes each including a forward path for transfer of information from source to destination through the network and a return path for returning congestion control signals;

U.S. Pat. No. 5,774,244 to Tandon et al. that describes an optical communications network that includes a plurality of passive optical networks (PONs) connected in a ring in PON address order, in which communication channels between terminals are wavelength multiplexed;

U.S. Pat. No. 6,233,082 to Johnson that describes an optical transmitter for generating any one of N carrier signals for use in an M-channel WDM system;

U.S. Pat. No. 5,867,289 to Gerstel et al that describes a fault detecting apparatus and method for a network node of an optical transmission system that receives a wavelength division multiplexed (WDM) optical signal which includes a group of optical channels;

U.S. Pat. No. 6,108,112 to Touma that describes non-faulty subscriber equipment that is quickly recovered from a communication failure caused by faulty subscriber equipment;

U.S. Pat. No. 4,626,075 to Chemla that describes a nonlinear optical device that includes a layered semiconductor structure having layers of different energy band gap materials;

U.S. Pat. No. 5,452,115 to Tomioka that describes a communication system that includes a wavelength multiplexing network having a plurality of transmission channels of different wavelengths, a plurality of nodes interconnected by the wavelength multiplexing network for performing data communications with other nodes using time slots into which time on each of the transmission channels is divided, each of the nodes having its transmitting wavelength fixed and unique to a node and its receiving wavelength set tunable, and a network controller for centrally controlling time slot allocation repeated for each frame to the nodes; and The following chapters in *The Communications Handbook,* CRC Press & IEEE Press, 1997, Editor-in-Chief Jerry D. Gibson: Chapter 37 on pages 513–528; Chapter 39 on pages 542–553; Chapter 40 on pages 554–564; Chapter 46 on pages 622–649; Chapter 51 on pages 686–700; and Chapter 65 on pages 883–890.

U.S. patent application Ser. No. 09/126,378 of Handelman, now U.S. Pat. No. 6,404,522, describes improvements in communication performance of an optical communication system that communicates data via N different channel wavelengths using WDM.

U.S. patent application Ser. No. 09/389,345 of Handelman, now U.S. Pat. No. 6,574,018, describes a network control system that may be embodied in various elements of a communication network that communicates optical signals multiplexed by WDM. The network control system may limit a number of channel wavelengths actually used for communicating optical signals to an end node, and control and modify data rates carried over channel wavelengths multiplexed by WDM.

U.S. patent application Ser. No. 09/624,983 of Handelman, now U.S. Pat. No. 6,763,191, describes an optical switching apparatus that selectively combines and separates series of optical signal samples using OTDM and/or WDM.

U.S. patent application Ser. No. 09/976,243 of Handelman et al, now published as Pub. No. US 2002/0048067, describes an optical switching apparatus that selectively combines and separates, using OTDM and/or WDM, optical signal samples that are obtained by a spread spectrum technique or a combination of optical signal samples that are obtained by a spread spectrum technique and optical signal samples that are carried over discrete channel wavelengths.

The disclosures of all references mentioned above and throughout the present specification are hereby incorporated herein by reference.

SUMMARY OF THE INVENTION

The present invention seeks to improve optical packet switching and routing and traffic engineering in optical communication networks that use either fixed-length optical packets or variable-length optical packets, or a combination of fixed-length optical packets and variable-length optical packets. The present invention may particularly be useful for optical communication networks that utilize Internet Protocol over wavelength division multiplexing (IP-over-WDM networks).

In the present invention, NW wavelengths that can be used in an optical packet switch for switching inputted optical packets are grouped into KG groups of wavelengths, where NW and KG are integers greater than one. The KG groups of wavelengths are characterized in that each of the KG groups of wavelengths is allocated to optical packets distinguished from other optical packets by at least one attribute of at least one packet characteristic. Each one inputted optical packet is switched over a wavelength having an available transmission resource selected from among wavelengths in one of the KG groups of wavelengths that is matched to the one inputted optical packet by correspondence of attributes of the at least one packet characteristic.

The present invention thus enables computations to be performed, for each inputted optical packet, only on a subset of the NW wavelengths. Since each subset of the NW wavelengths contains less than NW wavelengths, computation complexity of wavelength allocation and switching in the present invention is reduced with respect to computation complexity in prior-art traffic engineering techniques in which computations are performed on all the NW wavelengths.

Additionally, since according to the present invention each wavelength ultimately carries optical packets having similar attributes of packet characteristics, improvements may be obtained in terms of at least one of the following: transmission efficiency; quality-of-service (QoS); and network reliability/survivability.

The improvement in transmission efficiency may be obtained, for example, by grouping the NW wavelengths into the KG groups of wavelengths according to different attributes of a characteristic based on optical packet bit-rate range so that each of the KG groups of wavelengths is allocated to optical packets provided at a single bit-rate range. Each inputted optical packet is then switched over a wavelength that is allocated to optical packets provided at the same bit-rate range as the inputted optical packet, and therefore each wavelength ultimately carries optical packets at a single bit-rate range. Thus, cases in which a wavelength carries optical packets at different bit-rate ranges are avoided. Since such cases may adversely affect the overall transmission speed over the wavelength as mentioned in the parent U.S. patent application Ser. No. 09/944,603 which is incorporated herein by reference, avoidance of such cases improves transmission efficiency.

The improvement in QoS may be obtained, for example, by grouping the NW wavelengths into the KG groups of wavelengths according to different attributes of delay sensitivity of the inputted optical packets so that each group of wavelengths is allocated to optical packets having the same delay sensitivity level. A higher number of wavelengths may, for example, be allocated to delay sensitive optical packets than to delay insensitive optical packets thereby increasing the probability of transmission without delay of the delay sensitive optical packets which results in improvement of the QoS.

The improvement in network reliability may be obtained, for example, by grouping the NW wavelengths into the KG groups of wavelengths according to different attributes of a characteristic based on optical packet carrier wavelength band so that each of the KG groups of wavelengths includes wavelengths in a single wavelength band. Each group of wavelengths in a specific band is then allocated to optical packets originally carried over wavelengths in the same wavelength band as the specific band. In cases where wavelength conversion from one wavelength band to another wavelength band is not available or is limited, confinement of wavelength conversion to wavelengths within the same wavelength band prevents packet loss. Prevention of packet loss typically results in improvement of network reliability/survivability.

Further objects and features of the present invention will become apparent to those skilled in the art from the following description and the accompanying drawings.

There is thus provided in accordance with a preferred embodiment of the present invention an optical packet switching method for switching inputted optical packets over NW wavelengths, the inputted optical packets comprising optical packets having different attributes of at least one packet characteristic, where NW is an integer greater than one, the method including grouping the NW wavelengths into KG groups of wavelengths characterized in that each of the KG groups of wavelengths is allocated to optical packets distinguished from other optical packets by at least one attribute of the at least one packet characteristic, where KG is an integer greater than one, and switching each one inputted optical packet over a wavelength having an available transmission resource selected from among wavelengths in one of the KG groups of wavelengths that is matched to the one inputted optical packet by correspondence of attributes of the at least one packet characteristic.

Preferably, the at least one packet characteristic includes a characteristic based on one of the following: delay sensitivity, optical packet bit-rate range, optical packet carrier wavelength band, optical packet carrier wavelength separation from other wavelengths, optical packet carrier wavelength priority, and optical packet service level.

Alternatively, the at least one packet characteristic includes a characteristic based on a hierarchical combination of at least two of the following: delay sensitivity, optical packet bit-rate range, optical packet carrier wavelength band, optical packet carrier wavelength separation from other wavelengths, optical packet carrier wavelength priority, and optical packet service level.

Preferably, the transmission resource includes at least one of the following: a queue of optical packets, a wavelength, a lightpath, and a polarization direction over a wavelength.

The grouping preferably includes dynamically grouping the NW wavelengths into the KG groups of wavelengths based on changes in amounts of at least some of those of the inputted optical packets having the different attributes of the at least one packet characteristic. The changes are preferably determined prior to the grouping in at least one of the following: an optical network management system, and a switching/routing control unit of an optical packet switch.

Preferably, the dynamically grouping includes dynamically changing at least one of the following: group size of at least two of the KG groups, and KG.

There is also provided in accordance with a preferred embodiment of the present invention a wavelength allocation method for use in an optical packet switch to select from among NW wavelengths an output wavelength over which to output an optical packet, where NW is an integer greater than one, the method including grouping the NW wavelengths into KG groups of wavelengths characterized in that each of the KG groups of wavelengths is allocated to optical packets distinguished from other optical packets by at least one attribute of at least one packet characteristic, where KG is an integer greater than one, finding one of the KG groups of wavelengths that matches the optical packet by correspondence of attributes of the at least one packet characteristic, and selecting, from among wavelengths in the one of the KG groups of wavelengths, a wavelength having an available transmission resource as the output wavelength.

Preferably, the at least one packet characteristic includes one of the following: a characteristic based on one of the following: delay sensitivity, optical packet bit-rate range, optical packet carrier wavelength band, optical packet carrier wavelength separation from other wavelengths, optical packet carrier wavelength priority, and optical packet service level, and a characteristic based on a hierarchical combination of at least two of the following: delay sensitivity, optical packet bit-rate range, optical packet carrier wavelength band, optical packet carrier wavelength separation from other wavelengths, optical packet carrier wavelength priority, and optical packet service level.

The transmission resource preferably includes at least one of the following: a queue of optical packets, a wavelength, a lightpath, and a polarization direction over a wavelength.

Further in accordance with a preferred embodiment of the present invention there is provided an optical packet switch for switching inputted optical packets over NW wavelengths, the inputted optical packets comprising optical packets having different attributes of at least one packet characteristic, where NW is an integer greater than one, the optical packet switch including a switching fabric, and a switching/routing control unit operatively associated with the switching fabric and operative to control the switching fabric for switching each one inputted optical packet over a wavelength having an available transmission resource selected from among wavelengths in one of KG groups of wavelengths, where KG is an integer greater than one, the KG groups of wavelengths are formed by grouping the NW wavelengths and are characterized in that each of the KG groups of wavelengths is allocated to optical packets distinguished from other optical packets by at least one attribute of the at least one packet characteristic, and the one of KG groups of wavelengths is matched to the one inputted optical packet by correspondence of attributes of the at least one packet characteristic.

Preferably, the switching/routing control unit is operative to determine the KG groups of wavelengths and to determine, for each the one inputted optical packet, the wavelength having the available transmission resource in the one of KG groups of wavelengths.

Alternatively, the switching/routing control unit is operative to receive a determination of at least some of the KG groups of wavelengths from an optical network management system, and, based on the determination, to determine, for each the one inputted optical packet, the rest of the KG groups of wavelengths and the wavelength having the available transmission resource in the one of KG groups of wavelengths.

Preferably, the at least one packet characteristic includes one of the following: a characteristic based on one of the following: delay sensitivity, optical packet bit-rate range, optical packet carrier wavelength band, optical packet carrier wavelength separation from other wavelengths, optical packet carrier wavelength priority, and optical packet service level, and a characteristic based on a hierarchical combination of at least two of the following: delay sensitivity, optical packet bit-rate range, optical packet carrier wavelength band, optical packet carrier wavelength separation from other wavelengths, optical packet carrier wavelength priority, and optical packet service level.

The transmission resource preferably includes at least one of the following: a queue of optical packets, a wavelength, a lightpath, and a polarization direction over a wavelength.

There is also provided in accordance with a preferred embodiment of the present invention a wavelength allocation apparatus for use in an optical packet switch to select from among NW wavelengths an output wavelength over which to output an optical packet, where NW is an integer greater than one, the apparatus including a processing unit operative to group the NW wavelengths into KG groups of wavelengths characterized in that each of the KG groups of wavelengths is allocated to optical packets distinguished from other optical packets by at least one attribute of at least one packet characteristic, where KG is an integer greater than one, and a switching/routing control unit operatively associated with the processing unit and operative to perform the following: find one of the KG groups of wavelengths that matches the optical packet by correspondence of attributes of the at least one packet characteristic, and select, from among wavelengths in the one of the KG groups of wavelengths, a wavelength having an available transmission resource as the output wavelength.

Preferably, the at least one packet characteristic includes one of the following: a characteristic based on one of the following: delay sensitivity, optical packet bit-rate range, optical packet carrier wavelength band, optical packet carrier wavelength separation from other wavelengths, optical packet carrier wavelength priority, and optical packet service level, and a characteristic based on a hierarchical combination of at least two of the following: delay sensitivity, optical packet bit-rate range, optical packet carrier wavelength band, optical packet carrier wavelength separation from other wavelengths, optical packet carrier wavelength priority, and optical packet service level.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
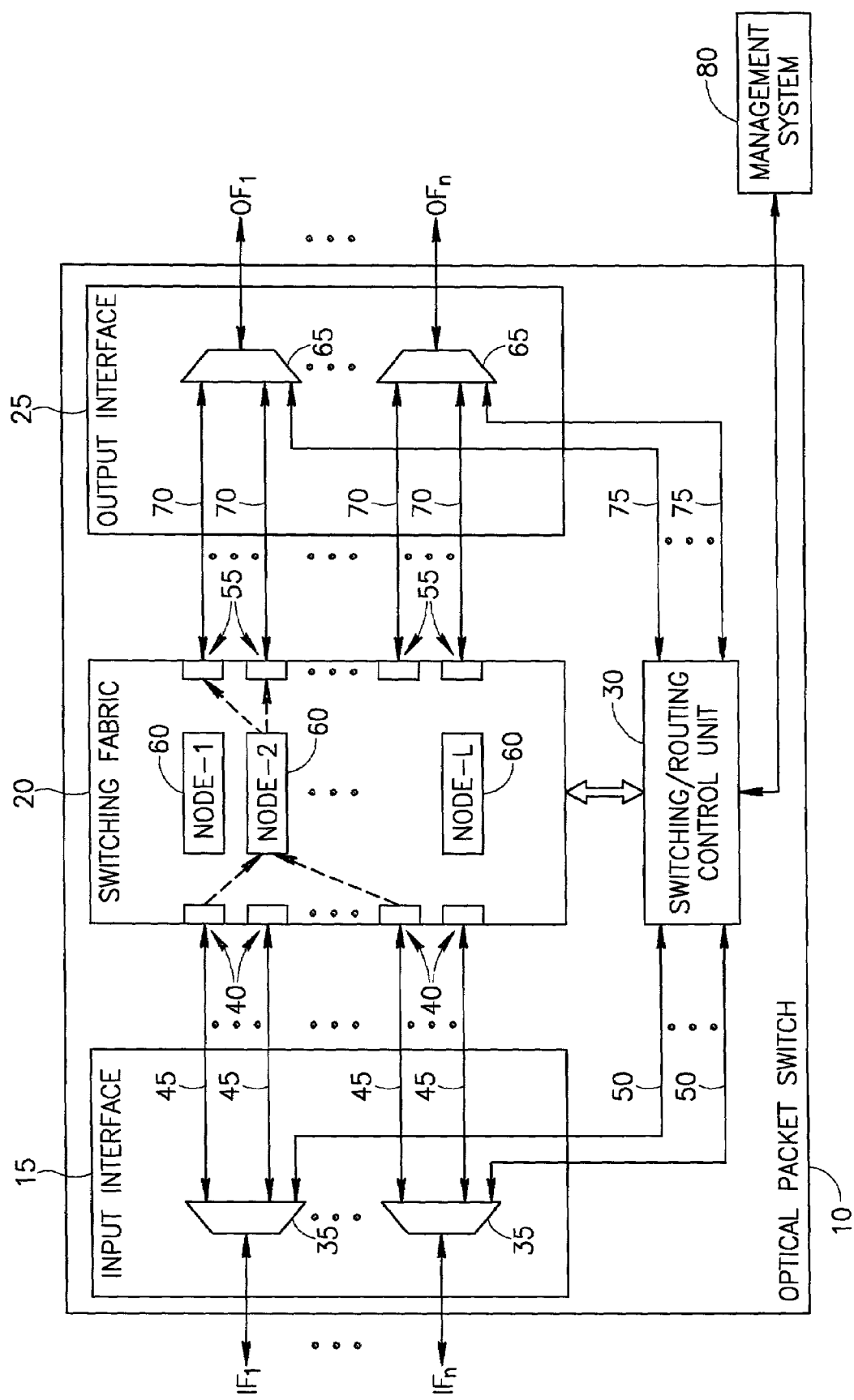
FIG. 1 is a simplified block diagram illustration of a preferred implementation of an optical packet switch, the optical packet switch being constructed and operative in accordance with a preferred embodiment of the present invention.

Reference is now made to FIG. 1 which is a simplified block diagram illustration of a preferred implementation of an optical packet switch 10, the optical packet switch 10 being constructed and operative in accordance with a preferred embodiment of the present invention.

The optical packet switch 10 preferably includes the following elements: an input interface 15; a switching fabric 20; an output interface 25; and a switching/routing control unit 30.

The input interface 15 is preferably operatively associated with a plurality of incoming fibers (IFs), such as n incoming fibers $IF_1, \ldots, IF_n$ where n is an integer. The n incoming fibers $IF_1, \ldots, IF_n$ are preferably respectively coupled to n optical demultiplexers 35 in the input interface 15. The n optical demultiplexers 35 are operative to demultiplex optical signals carried by the incoming fibers $IF_1, \ldots, IF_n$ and to provide optical packets carrying information to a plurality of input ports 40 of the switching fabric 20 over a plurality of channel wavelengths 45, and control information including optical packets and headers of optical packets to the switching/routing control unit 30 over n control channel wavelengths 50. Throughout the present specification and claims, the terms "channel wavelength", "wavelength" and "optical channel" are interchangeably used.

The switching fabric 20 preferably includes, in addition to the plurality of input ports 40, a plurality of output ports 55 and a plurality of switching nodes 60, such as L switching nodes 60, where L is an integer greater than one. The term "switching node" is used throughout the present specification and claims in a broad sense to include an element or a junction of an optical communication switch that switches optical packets and optical signals received thereat to at least one of the following: another switching node; a port of the optical communication switch; and an external network element. Each input port and output port of a switching fabric in the optical communication switch may also be a switching node. The term "switching node" also covers an entire optical communication switch. In a multi-stage optical communication switch, switching nodes are arranged in stages such that a switching node may switch optical signals received thereat from a lower stage node to a higher stage node.

The term "switching node" is further used throughout the present specification and claims to cover a passive switching node as well as an active switching node. The term "passive switching node" is used throughout the present specification and claims to include a switching node that passively switches optical packets under control of a switching/routing control unit without altering the optical packets or determining any operation to be performed on the optical packets. Any operation to be performed on the optical packets other than routing of the optical packets, such as a channel wavelength conversion operation, is carried out external of the passive switching node. It is appreciated that passive switching nodes may be implemented, for example, by conventional optical Micro-Electro-Mechanical Systems (MEMS) devices.

The term "active switching node" is used throughout the present specification and claims to include a switching node that has means for performing operations on optical packets, such as means for changing a channel wavelength over which the optical packets are outputted and means for delaying the optical packets. The operations on the optical packet are therefore carried out within the active switching node, typically under control of a switching/routing control unit.

Preferably, the switching/routing control unit 30 processes the control information received thereat from the optical demultiplexers 35 and generates control settings that are used to control routing of the optical packets from the input ports 40 to the output ports 55 through the switching nodes 60. Referring for example, and without limiting the description, to the switching fabric 20 as a one-stage switching fabric, optical packets can be switched from the input ports 40 to the output ports 55 via one set of switching nodes 60 typically corresponding to the plurality of output ports 55.

In the embodiment depicted in FIG. 1, the switching nodes 60 in the switching fabric 20 of the optical packet switch 10 are preferably active switching nodes.

It is however appreciated that the present invention is not limited to the configuration depicted in FIG. 1. Rather, the switching fabric 20 may be replaced by a multi-stage switching fabric (not shown), or alternatively by a switching fabric (not shown) in which there are only input/output ports that serve as switching nodes that receive optical packets and output switched optical packets.

Preferably, regardless of the node configuration of the switching fabric 20, switched optical packets are received at the output ports 55 and provided to n optical multiplexers 65 in the output interface 25 via a plurality of output paths 70. The n optical multiplexers 65 preferably multiplex optical packets provided via the output paths 70 according to control information including optical packets and headers of optical packets provided by the switching/routing control unit 30 over n control channel wavelengths 75. The n multiplexers 65 preferably output multiplexed optical packets to n outgoing fibers $OF_1, \ldots, OF_n$.

Preferably, each switching node 60 may receive optical packets from more than one input port 40 over more than one wavelength. Each switching node 60 may thus output optical packets originating from different incoming fibers and originally carried over different wavelengths. Each switching node 60 preferably outputs the optical packets to one or more of the plurality of output paths 70 via one or more of the plurality of output ports 55. The output paths 70 are preferably ultimately associated with one or more destinations via one or more of the outgoing fibers $OF_1, \ldots, OF_n$.

The term "destination" is used throughout the specification and claims to include a network element (NE) towards which transmission from another NE is directed. A destination may typically include one of the following: a router; a server; a remote optical communication switch; and a user terminal. A destination is therefore typically capable of receiving optical packets over one wavelength or more than one wavelength from a single NE. A destination is also capable of receiving optical packets from a plurality of separate network elements over a plurality of wavelengths.

The term "output path" is used throughout the specification and claims to include a lightpath such as a wavelength over which optical packets and optical signals are conveyed when outputted from an element of an optical packet switch such as a switching node. The output path is typically combined, with additional output paths and provided, together with the additional output paths, via any suitable medium such as a lightguide within the element, or a fiber optic cable within the element or attached to the element. A portion of the output path, or even the whole output path, may include an optical wireless path. The output path may ultimately be associated with a destination via a route passing through an optical multiplexer/demultiplexer (MUX/DEMUX) that is coupled to an output port of the optical packet switch and a fiber optic cable associated with the optical MUX/DEMUX. Alternatively, the output path may ultimately be associated with a destination via a route provided, for example, through a wireless transmitter that wirelessly communicates with the destination. The terms "output path" and "destination route" are interchangeably used throughout the present specification and claims.

It is appreciated that the optical packet switch 10 may be embodied in a single photonic integrated circuit (not shown) in which case the input interface 15, the switching fabric 20, the output interface 25, and at least a portion of the switching/routing control unit 30 may form part of the single photonic integrated circuit.

The switching/routing control unit 30 may preferably be operatively associated with an external optical network management system 80 for one-way or two-way communication of management information.

In operation, the optical packet switch 10 receives inputted optical packets comprising optical packets having different attributes of at least one packet characteristic at the input interface 15. The input interface 15 preferably provides the inputted optical packets to the switching fabric 20 and control information including control optical packets and labels and/or headers of optical packets to the switching/routing control unit 30. The at least one packet characteristic may include, for example, a characteristic based on one of the following: delay sensitivity; optical packet bit-rate range; optical packet carrier wavelength band; optical packet carrier wavelength separation from other wavelengths; optical packet carrier wavelength priority; and optical packet service level.

The switching/routing control unit 30 preferably configures the switching nodes 60 in the switching fabric 20 in a switching configuration that takes into account the different attributes of the at least one packet characteristic of the inputted optical packets as described herein below. The switching configuration is preferably suitable for switching the inputted optical packets via the output interface 25 to some or all of the outgoing fibers $OF_1, \ldots, OF_n$ as necessary. The switching configuration may be, for example, one of the following: a pre-selected configuration; a configuration determined substantially in real-time; and a programmed configuration programmed by a processor (not shown) that may form part of the switching/routing control unit 30 or, for example, of the management system 80.

It is appreciated that the optical packet switch 10 may preferably communicate in half-duplex or full duplex communication. In such a case, optical packets may be inputted to the optical packet switch 10 either via $IF_1, \ldots, IF_n$ or $OF_1, \ldots, OF_n$ and outputted via $OF_1, \ldots, OF_n$ or $IF_1, \ldots, IF_n$ respectively.

Figure 2:
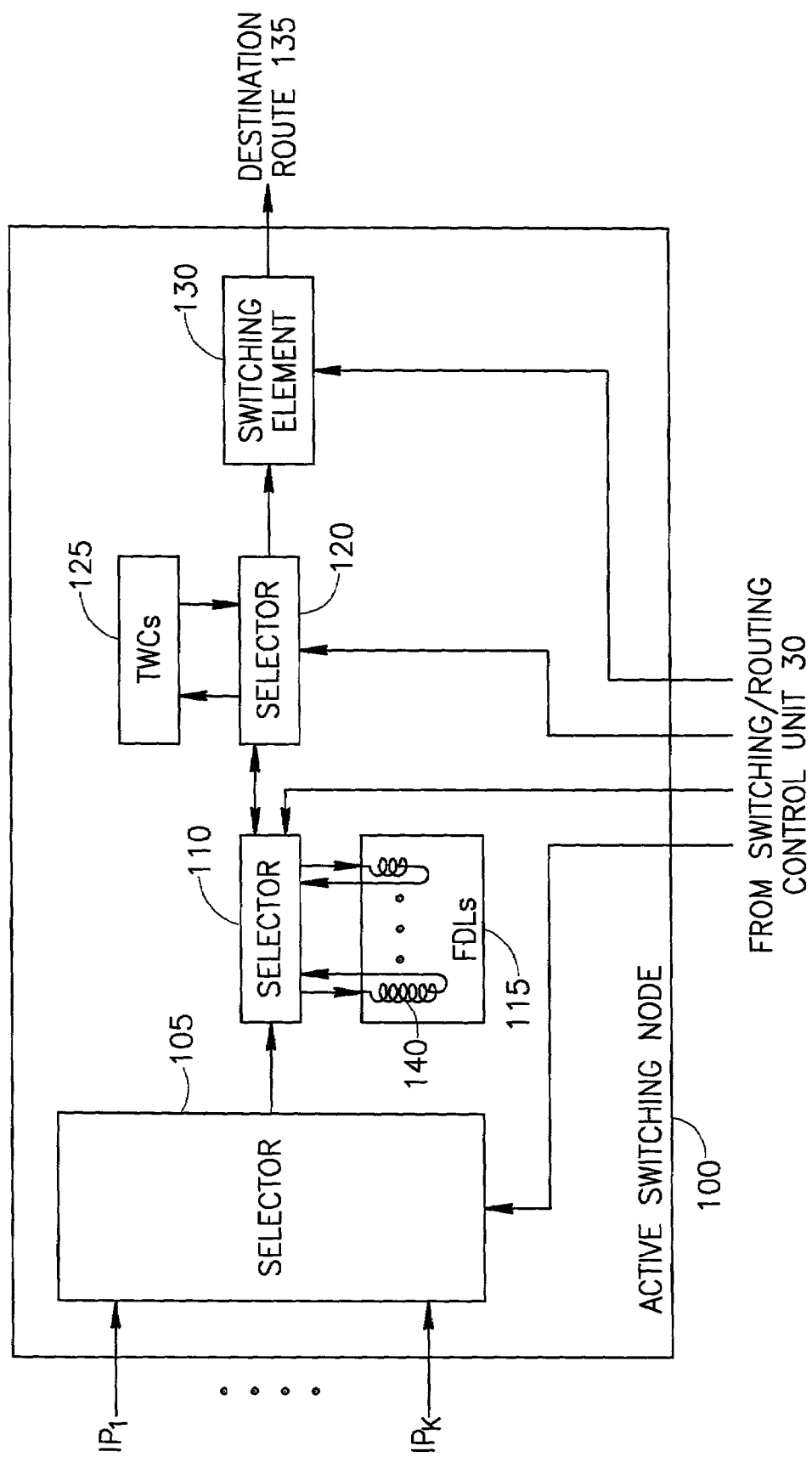
FIG. 2 is a simplified block diagram illustration of a preferred implementation of an active switching node in the optical packet switch of FIG. 1.

Reference is now additionally made to FIG. 2 which is a simplified block diagram illustration of a preferred implementation of an active switching node in the optical packet switch 10 of FIG. 1. For simplicity, the description below refers to one of the switching nodes 60 in FIG. 1 that is also indicated as NODE-2. NODE-2 of FIG. 1 is referred to in FIG. 2 as an active switching node 100. It is appreciated that the present invention is not limited by referring to the active switching node 100 because all the active switching nodes 60 in FIG. 1 may preferably be similar in structure and functionality.

The active switching node 100 may preferably include the following elements: an input selector 105; a buffering selector 110; a module of fiber delay lines (FDLs) 115; a wavelength conversion selector 120; a module of tunable wavelength converters (TWCs) 125; and a switching element 130. The switching element 130 preferably includes an element that directs light to a destination route 135.

It is appreciated that the selectors 105, 110 and 120 may each include, for example, a conventional mechanical switch, such as a space switch that physically moves a light directing element such as a piece of a fiber optic cable or a mirror (both not shown) thereby selecting an optical path for passage of incoming optical packets. The selectors 105, 110 and 120 may, for example, be embodied in a single selector element (not shown). Preferably, the switching/routing control unit 30 controls operation of the selectors 105, 110 and 120. It is appreciated that the switching/routing control unit 30 may control operation of the selectors 105, 110 and 120 based in part, for example, on management information provided by the management system 80.

When an optical packet is inputted to the input selector 105 via one of a plurality of input paths $IP_1, \ldots, IP_k$ where k is an integer, the active switching node 100 may preferably either route the optical packet to the destination route 135 without altering the optical packet, or alter the optical packet before routing to the destination route 135. In a case where the optical packet inputted at the input selector 105 is not altered by the active switching node 100, the selectors 105, 110, and 120 may preferably be arranged in a configuration that directly provides the optical packet to the switching element 130. The switching element 130 may then direct the optical packet to the destination route 135.

In a case where the optical packet inputted to the input selector 105 is altered by the active switching node 100, the active switching node 100 may preferably delay the optical packet and/or convert a wavelength over which the optical packet is carried as necessary.

In order to delay the optical packet, the selector 105 may preferably provide the optical packet to the selector 110 that may preferably select an FDL in the module of FDLs 115, such as an FDL 140, and direct the optical packet to the FDL 140. The FDL 140 delays the optical packet and outputs a delayed optical packet via the selector 110.

In order to convert a wavelength over which the optical packet is carried the optical packet may be provided to the selector 120, either without delaying the optical packet beforehand or after delaying the optical packet. The selector 120 may preferably select a TWC (not shown) in the module of TWCs 125. Then, the optical packet is directed to the selected TWC that is preferably operative to convert the wavelength over which the optical packet is carried to a new wavelength thereby providing an optical packet carried over the new wavelength. The optical packet carried over the new wavelength is then preferably outputted via the selector 120. It is appreciated that the optical packet may be delayed after wavelength conversion to the new wavelength if it was not delayed before the wavelength conversion and if delaying of the optical packet is required.

Thus, optical packets arriving at the switching element 130 and routed thereby may include at least one of the following types: unaltered optical packets; delayed optical packets; optical packets carried over converted channel wavelengths; and delayed optical packets that are carried over converted channel wavelengths.

It is appreciated that optical packets inputted via $IP_1, \ldots, IP_k$ may be provided either via $IF_1, \ldots, IF_n$ or $OF_1, \ldots, OF_n$ and outputted via $OF_1, \ldots, OF_n$ or $IF_1, \ldots, IF_n$ respectively thereby enabling half-duplex or full duplex communication.

Figure 3:
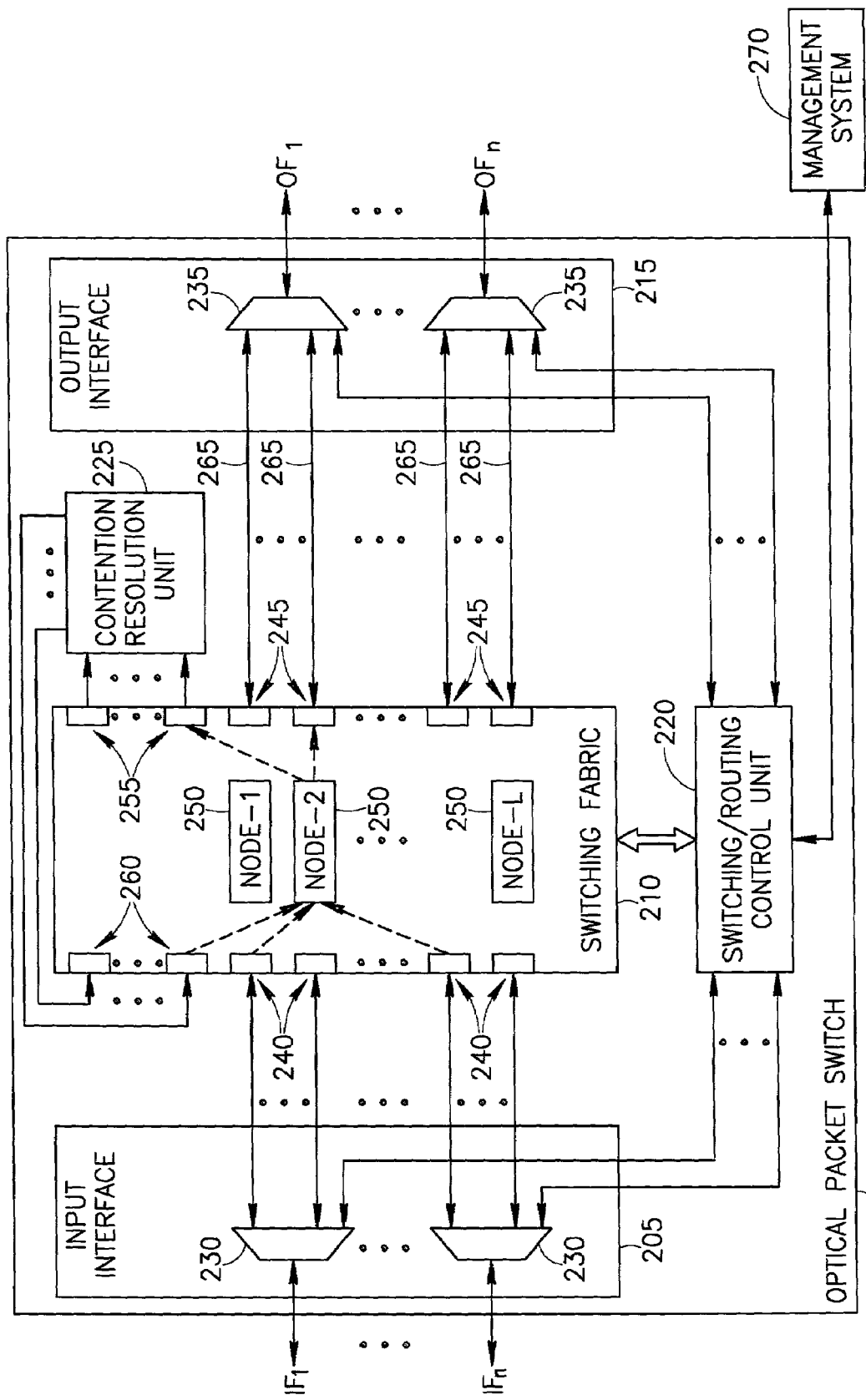
FIG. 3 is a simplified block diagram illustration of a preferred implementation of an optical packet switch having passive switching nodes, the optical packet switch being constructed and operative in accordance with a preferred embodiment of the present invention.

Reference is now made to FIG. 3 which is a simplified block diagram illustration of a preferred implementation of an optical packet switch 200 having passive switching nodes, the optical packet switch 200 being constructed and operative in accordance with a preferred embodiment of the present invention.

The optical packet switch 200 preferably includes the following elements: an input interface 205; a switching fabric 210; an output interface 215; a switching/routing control unit 220; and a contention resolution unit 225. It is appreciated that the optical packet switch 200 or at least a part thereof, may be embodied in a single photonic integrated circuit (not shown).

The input interface 205 may preferably be similar in structure and functionality to the input interface 15 of FIG. 1 and may include n demultiplexers 230 that receive optical packets from a plurality of incoming fibers $IF_1, \ldots, IF_n$. The n demultiplexers 230 may preferably be similar in structure and functionality to the n demultiplexers 35 of FIG. 1. The output interface 215 may preferably be similar in structure and functionality to the output interface 25 of FIG. 1 and may include n multiplexers 235 that output multiplexed optical packets to n outgoing fibers $OF_1, \ldots, OF_n$. The n multiplexers 235 may preferably be similar in structure and functionality to the n multiplexers 65 of FIG. 1.

The switching fabric 210 preferably includes the following elements: a plurality of input ports 240; a plurality of output ports 245; a plurality of passive switching nodes 250 such as L passive switching nodes; a plurality of input ports 255 via which optical signals are inputted to the contention resolution unit 225; and a plurality of output ports 260 via which optical signals are outputted from the contention resolution unit 225.

The passive switching nodes 250 depicted in FIG. 3 are arranged in a single stage configuration of switching nodes but it is appreciated that the present invention is not limited to the configuration depicted in FIG. 3. Rather, the switching fabric 210 may be replaced by a multi-stage switching fabric (not shown), or alternatively by a switching fabric (not shown) in which there are only input/output ports that serve as switching nodes that receive optical packets and output switched optical packets.

Preferably, the switching/routing control unit 220 controls the contention resolution unit 225, for example, via a link in the switching fabric 210 (not shown). The contention resolution unit 225 may preferably include a plurality of conventional TWCs (not shown) and a plurality of conventional FDLs (not shown) connected, for example, in series as is well known in the art, for example, from the WASPNET architecture described in the above mentioned article of Hunter et al in *IEEE Communications Magazine*, September 2000 the disclosure of which is incorporated herein by reference. Preferably, the switching/routing control unit 220 may separately control each FDL and each TWC in the contention resolution unit 225.

The switching/routing control unit 220 preferably processes control information received thereat from the input interface 205 and generates control settings that are used to control routing of optical packets from the input ports 240 to the output ports 245 through the passive switching nodes 250, and, if necessary, also through the contention resolution unit 225. The control settings generated by the switching/routing control unit 220 are different from the control settings generated by the switching/routing control unit 30 of FIG. 1 because the switching fabric 210 and the switching fabric 20 of FIG. 1 operate differently as described below.

In operation, the optical packet switch 200 receives inputted optical packets comprising optical packets having different attributes of at least one packet characteristic at the input interface 205. The input interface 205 preferably provides the inputted optical packets to the switching fabric 210 and control information including optical packets and labels and/or headers of optical packets to the switching/routing control unit 220. The at least one packet characteristic may include, for example, a characteristic as mentioned above with reference to FIG. 1.

Preferably, the switching/routing control unit 220 configures the passive switching nodes 250 and the contention resolution unit 225 in a switching configuration that takes into account the different attributes of the at least packet characteristic of the inputted optical packets as described herein below. The switching configuration may be, for example, one of the following: a pre-selected configuration; a configuration determined substantially in real-time; and a programmed configuration programmed by a processor (not shown) that may form part of the switching/routing control unit 30.

The switching configuration preferably allows inputted optical packets that need not be altered be directly fed to the output interface 215. However, inputted optical packets that must be altered are directed by the passive switching nodes 250 under control of the switching/routing control unit 220 to the contention resolution unit 225 via at least one of the input ports 255. It is appreciated that alteration of an inputted optical packet may include conversion of a wavelength over which the inputted optical packet is conveyed and/or delay of the inputted optical packet.

At the contention resolution unit 225, channel wavelengths of inputted optical packets are preferably converted, if necessary, by the TWCs and inputted optical packets are preferably delayed, if necessary, by the FDLs as is well known in the art. It is appreciated that for each inputted optical packet, application of the switching configuration at the contention resolution unit 225 results in a selection of a magnitude of a delay by which to delay the inputted optical packet and a channel wavelength over which to output the inputted optical packet. The selection of the magnitude of the delay by which to delay the inputted optical packet and the channel wavelength over which to output the inputted optical packet typically results in a respective selection of a specific FDL and a specific TWC by the switching/routing control unit 220. It is appreciated that the switching/routing control unit 220 may select each FDL and TWC in the contention resolution unit 225 either directly or by providing selections and instructions to a controller (not shown) in the contention resolution unit 225 that controls the FDLs and TWCs.

After performing necessary wavelength conversion operations and delay operations, the contention resolution unit 225 preferably outputs optical packets that do not contend for bandwidth to the passive switching nodes 250 via the output ports 260. The passive switching nodes 250 preferably direct optical packets received from the contention resolution unit 225 to the output interface 215 under control of the switching/routing control unit 220.

Thus, the passive switching nodes 250 only direct optical packets to the output interface 215 or the contention resolution unit 225 without performing operations on the optical packets that alter the optical packets. Preferably, operations that alter the optical packets are performed in the contention resolution unit 225 under control of the switching/routing control unit 220.

Preferably, each passive switching node 250 may receive optical packets from more than one input port 240 or output port 260 over more than one channel wavelength. Each switching node 250 may thus output optical packets originating from different incoming fibers and originally carried over different wavelengths. Each switching node 250 preferably outputs the optical packets to one or more of the plurality of output ports 245 over a plurality of output paths 265 that are ultimately associated with one or more destinations via one or more of the outgoing fibers $OF_1, \ldots, OF_n$.

The switching/routing control unit 220 may preferably be operatively associated with an external optical network management system 270 for one-way or two-way communication of management information. It is appreciated that the switching configuration used by the switching/routing control unit 220 may be based, for example in part, on the management information.

The optical packet switch 200 may preferably communicate in half-duplex or full duplex communication. In such a case, optical packets may be inputted to the optical packet switch 200 either via $IF_1, \ldots, IF_n$ or $OF_1, \ldots, OF_n$ and outputted via $OF_1, \ldots, OF_n$ or $IF_1, \ldots, IF_n$ respectively.

The apparatus of FIGS. 1–3 may preferably switch either fixed-length optical packets or variable-length optical packets that are also referred to as bursts, and even both fixed-length optical packets and bursts. The ability to switch fixed-length optical packets and/or bursts depends mainly on the way optical packets are processed by the switching/routing control units 30 and 220. The structure and functionality of each of the switching/routing control units 30 and 220 may therefore differ depending on the type of optical packets switched thereby.

For example, if the switching/routing control units 30 and 220 operate on fixed-length optical packets, each of the switching/routing control units 30 and 220 may preferably perform synchronization operations to synchronize incoming optical packets and header rewriting operations to rewrite headers of outgoing optical packets as is well known in the art, for example, from the KEOPS architecture described in the above mentioned articles of Hunter et al and Listanti et al in *IEEE Communications Magazine*, September 2000 the disclosures of which are incorporated herein by reference. It is appreciated that at least some of the synchronization operations may be performed in the input interfaces 15 and 205 rather than in the switching/routing control units 30 and 205 respectively. Alternatively or additionally, at least some of the header rewriting operations may be performed in the output interfaces 25 and 215 rather than in the switching/routing control units 30 and 220 respectively.

If the switching/routing control units 30 and 220 operate on bursts, each of the switching/routing control units 30 and 220 may preferably perform scheduling and buffering operations on burst control packets (BCPs) as is well known in the art, for example, from the optical burst switching architectures described in the above mentioned articles of Qiao and Listanti et al in *IEEE Communications Magazine,* September 2000 the disclosures of which are incorporated herein by reference.

It is appreciated that if the switching/routing control units 30 and 220 operate on both fixed-length optical packets and bursts, each of the switching/routing control units 30 and 220 may preferably include elements (not shown) that are capable of performing the above mentioned synchronization operations and header rewriting operations on the fixed-length packets, and the above mentioned scheduling and buffering operations on the BCPs.

Each switching configuration that is implemented by the apparatus of FIG. 3 or the apparatus of FIG. 1 with active switching nodes as described in FIG. 2, is typically aimed at solving a problem of bandwidth contention among some of inputted optical packets. Bandwidth contention is defined as contention for a wavelength at the same time among optical packets arriving on a plurality of optical paths. A solution to the problem of bandwidth contention may thus be obtained by proper selections of a delay for each inputted optical packet, and a wavelength over which to transmit each inputted optical packet. The selections of a delay and a wavelength for each inputted optical packet must be performed simultaneously in order to choose the right output path.

The selection of a delay corresponds, in fact, to a selection of an FDL in the contention resolution unit 225 in a case where switching of inputted optical packets is performed using the apparatus of FIG. 3, or a selection of an FDL in the module of FDLs 115 of FIG. 2 in a case where switching of the inputted optical packets is performed using the apparatus of FIG. 1. The selection of a wavelength corresponds, in fact, to a selection of a TWC in the contention resolution unit 225 in the case where switching of the inputted optical packets is performed using the apparatus of FIG. 3, or a selection of a TWC in the module of TWCs 125 of FIG. 2 in the case where switching of the inputted optical packets is performed using the apparatus of FIG. 1.

The bandwidth contention problem may thus be viewed as a problem of performing a selection of one out of NW parallel wavelengths for each inputted optical packet that must be switched, that is placed in a queue for transmission over a wavelength, where NW is an integer greater than one. The NW wavelengths are not necessarily identical to wavelengths over which the inputted optical packets are inputted in the apparatus of FIG. 1 or the apparatus of FIG. 3 in a case where wavelength conversion is supported.

The one wavelength selected out of the NW wavelengths and allocated to the inputted optical packet must meet a requirement of having an available transmission resource, such requirement determining in fact a selection of a delay for the inputted optical packet. A wavelength may be referred as having an available transmission resource for an inputted optical packet if the inputted optical packet can be outputted over the wavelength during a switching period of the inputted optical packet without contention with other optical packets. In other words, the inputted optical packet can be placed without contention with other optical packets in a queue of optical packets that is carried over the wavelength or in a specific polarization direction over the wavelength along a lightpath. The terms "queue of optical packets", "wavelength", "lightpath" and "polarization direction over a wavelength" thus refer to different aspects of a transmission resource that may be either available or unavailable for the inputted optical packet. Therefore, a transmission resource is used throughout the present specification and claims to include at least one of the following: a queue of optical packets; a wavelength; a lightpath; and a polarization direction over a wavelength.

State-of-the-art traffic engineering techniques attempt to optimize the allocation of one out of the NW wavelengths to each inputted optical packet in order to utilize each wavelength that carries optical packets with as little as possible gaps between adjacent optical packets, and to reduce congestion and loss of packets. Such traffic engineering techniques are described, for example, in the above mentioned articles of Song et al and Callegati et al in *Optical Networks Magazine,* November/December 2001 the disclosures of which are incorporated herein by reference.

However, as optical switches become more complex with more wavelengths used thereby, NW increases thereby increasing computation complexity of prior art traffic engineering techniques which results in a demand for more powerful and more expensive computation resources. Additionally, the prior art traffic engineering techniques do not distinguish among optical packets having different attributes of packet characteristics and therefore undesired events may occur, such as events in which delay insensitive optical packets are switched before delay sensitive optical packets thereby delaying transmission of the delay sensitive optical packets.

In the present invention, the apparatus of FIG. 3 and the apparatus of FIG. 1 with active switching nodes as described in FIG. 2 may preferably employ similar switching configurations and similar switching techniques that take into account different attributes of packet characteristics of inputted optical packets and use less computations than the prior art traffic engineering techniques. Such similar switching configurations and similar switching techniques that take into account the different attributes of packet characteristics of inputted optical packets and may be implemented in the apparatus of FIGS. 1–3 are described herein below with reference to FIG. 4.

Figure 4:
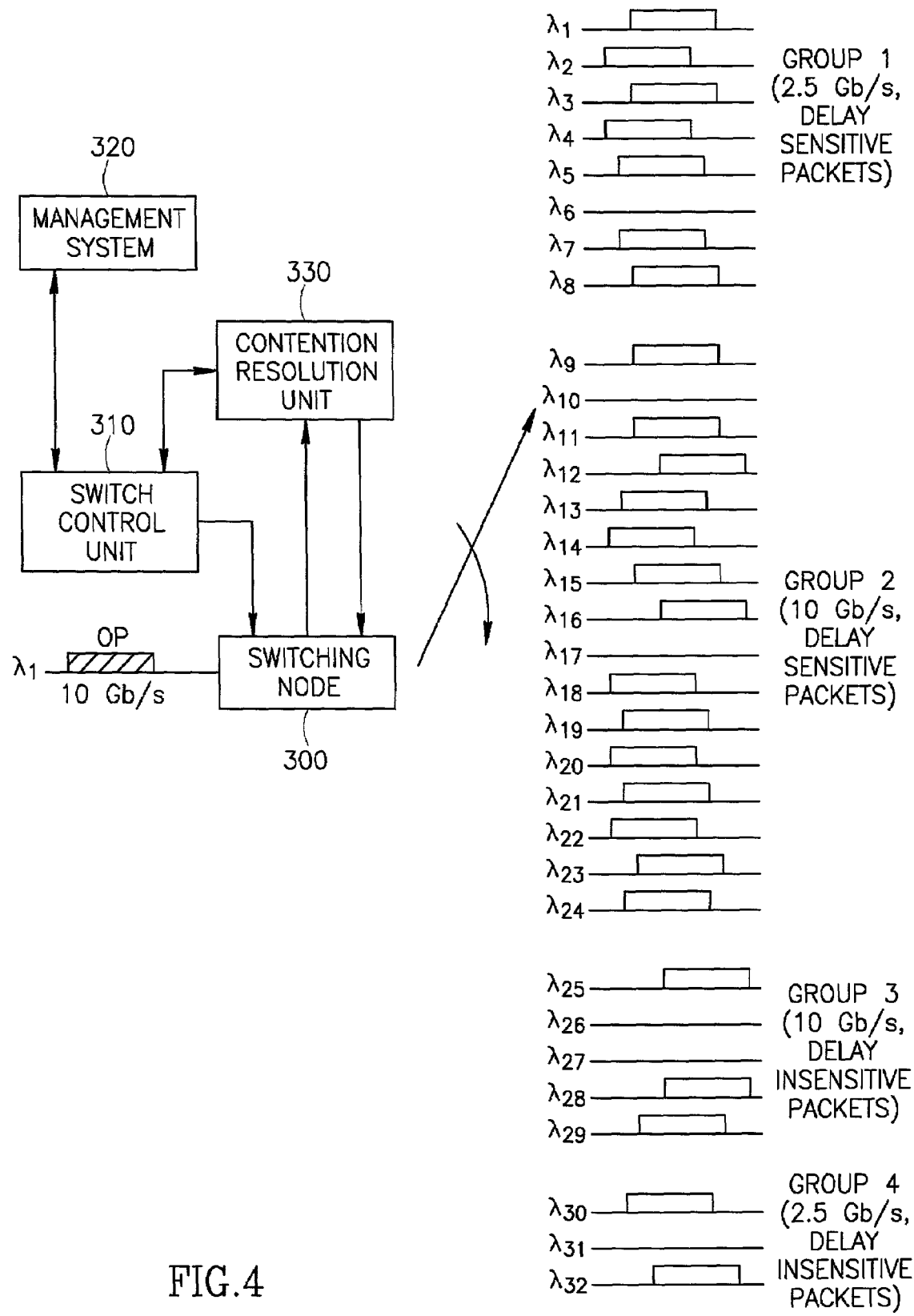
FIG. 4 is a simplified partly pictorial, partly block diagram illustration depicting switching at a single switching node level in the apparatus of FIGS. 1–3.

Reference is now additionally made to FIG. 4 which is a simplified partly pictorial, partly block diagram illustration depicting switching at a single switching node level in the apparatus of FIGS. 1–3.

The term "single switching node level" is used throughout the specification and claims to refer to an environment of a single switching node in terms of operations, connections and structural elements that influence the switching node, particularly when the switching node forms part of a larger system. Switching by an optical packet switch, such as the optical packet switch 10 or the optical packet switch 200, is referred to as switching at an optical packet switch level and it is composed of a plurality of switching operations, each performed at a single switching node level.

A single switching node referred to in FIG. 4 is indicated by reference numeral 300. The switching node 300 may be either one of the switching nodes 250 in the optical packet switch 200, or one of the switching nodes 60 in the optical packet switch 10. Preferably, the switching node 300 is controlled by a switch control unit 310 that may be the switching/routing control unit 220 in a case where the switching node 300 is embodied in the optical packet switch 200, or the switching/routing control unit 30 in a case where the switching node 300 is embodied in the optical packet switch 10.

The switch control unit 310 is preferably operatively associated with a management system 320 that may be the management system 270 in the case where the switching node 300 is embodied in the optical packet switch 200, or the management system 80 in the case where the switching node 300 is embodied in the optical packet switch 10.

Preferably, each of the switch control unit 310 and the switching node 300 is operatively associated with a contention resolution unit 330. The contention resolution unit 330 may preferably be the contention resolution unit 225 in the case where the switching node 300 is embodied in the optical packet switch 200. In the case where the switching node 300 is embodied in the optical packet switch 10, the contention resolution 330 preferably forms part of the switching node 300.

Without limiting the generality of the foregoing, the switching node 300 depicted in FIG. 4 is a passive switching node such as one of the switching nodes 250 embodied in the optical packet switch 200. The contention resolution unit 330 depicted in FIG. 4 is thus a contention resolution unit that is external to the switching node 300, such as the contention resolution unit 225.

The switching node 300 preferably switches to one or more destinations (not shown), under control of the switch control unit 310, inputted optical packets comprising optical packets having different attributes of at least one packet characteristic. The inputted optical packets may include synchronous fixed-length optical packets or asynchronous bursts, and even both synchronous fixed-length optical packets and asynchronous bursts. The inputted optical packets may be coded in various line codes such as a return-to-zero (RZ) line code and a non-return-to-zero (NRZ) line code. Preferably, the switching node 300 may be used in half-duplex or full duplex communication between two communication ends (not shown) in which case the inputted optical packets fed to the switching node 300 may originate from any one of the two communication ends.

The inputted optical packets may preferably be produced in any appropriate packet-based network that utilizes optical packets. For example, the inputted optical packets may include IP packets that are produced in an IP-over-WDM network (not shown), or an Ethernet based network such as a Gigabit Ethernet (GBE) network. Alternatively, The inputted optical packets may be produced in an IP-over-SDH-over-WDM (IPoSDHoWDM) network or an IP-over-SONET-over-WDM (IPoSONEToWDM) network in which case the inputted optical packets may include IP packets framed by SDH (Synchronous digital Hierarchy) framing or by SONET (Synchronous Optical Network) framing respectively. Further alternatively, the inputted optical packets may be produced in an IP-over-ATM-over-WDM (IPoATMoWDM) network.

Differences in attributes of packet characteristics among the inputted optical packets may be related, for example, to at least one of the following characteristics: delay sensitivity; optical packet bit-rate range; optical packet carrier wavelength band; optical packet carrier wavelength separation from other wavelengths; optical packet carrier wavelength priority; and optical packet service level. For example, inputted optical packets may have different attributes of a delay sensitivity characteristic if the inputted optical packets include delay sensitive optical packets and delay insensitive optical packets, or optical packets that may sustain various delay periods.

A difference in attributes of a characteristic based on optical packet bit-rate range among inputted optical packets typically occurs when the inputted optical packets include optical packets that arrive to the switching node 300 from different sources that transmit at different bit-rates.

A difference in attributes of a characteristic based on optical packet carrier wavelength band among inputted optical packets may occur when the inputted optical packets include optical packets that are inputted to the switching node 300 at different wavelength bands. For example, the inputted optical packets may include optical packets that are carried over different wavelengths in the following wavelength bands: 1488–1518 nanometer (nm) (the S-Band); 1526–1563 nm (the C-Band); and 1569–1613 nm (the L-Band). It is appreciated that the inputted optical packets may alternatively be carried over different wavelengths in any other suitable combination of appropriate wavelength bands.

A difference in attributes of a characteristic based on optical packet carrier wavelength separation from other wavelengths among inputted optical packets may occur when the wavelengths over which the inputted optical packets are carried are not uniformly distributed. For example, if the inputted optical packets are carried over the wavelengths $\lambda_1 = 1526$ nm, $\lambda_2 = 1527$ nm, $\lambda_3 = 1528$ nm, $\lambda_4 = 1530$ nm, and $\lambda_5 = 1534$ nm, channel spacing between $\lambda_1$ and $\lambda_2$ or $\lambda_2$ and $\lambda_3$, which is 1 nm, is different from channel spacing between $\lambda_4$ and $\lambda_5$ which is 4 nm.

A difference in attributes of a characteristic based on optical packet carrier wavelength priority among inputted optical packets may occur when some wavelengths over which the inputted optical packets are carried have higher priority than other wavelengths. For example, in a case where communication over a wavelength or a plurality of wavelengths is known to be susceptible to interference of some type, the wavelength or the plurality of wavelengths may be assigned a lower priority than wavelengths that are not susceptible to the interference.

A difference in attributes of a characteristic based on optical packet service level among inputted optical packets typically occurs when the inputted optical packets include optical packets that are transmitted at different service levels.

Preferably, the inputted optical packets are inputted to the switching node 300 over one wavelength or a plurality of wavelengths, and outputted from the switching node 300 over one wavelength or a plurality of wavelengths. In a case where wavelength conversion is applied by the contention resolution unit 330, the wavelengths over which the inputted optical packets are fed to the switching node 300 need not necessarily be identical to the wavelengths over which the inputted optical packets are outputted from the switching node 300.

It is appreciated that any wavelength over which the inputted optical packets are carried at input to the switching node 300 or at output from the switching node 300 may preferably be a wavelength that can be utilized to convey optical communication signals. For example, any wavelength over which the inputted optical packets are carried may preferably be a wavelength in a wavelength band of an order of magnitude of tens nanometers around one of the following wavelengths: 780 nm; 980 nm; 1310 nm; 1480 nm; 1510 nm; 1550 nm; and 1620 nm.

The above mentioned NW parallel wavelengths are preferably wavelengths over which the inputted optical packets are carried when outputted from the switching node 300. The switching node 300 must therefore switch each inputted optical packet provided thereto over one out of the NW wavelengths.

In accordance with a preferred embodiment of the present invention, the switch control unit 310, either independently or in combination with a processing unit (not shown) that may be embodied in the management system 320, groups the NW wavelengths into KG groups of wavelengths, where KG is an integer greater than one. Preferably, the KG groups of wavelengths are characterized in that each of the KG groups of wavelengths is allocated to optical packets distinguished from other optical packets by at least one attribute of at least one packet characteristic. Then, the switching node 300, under control of the switch control unit 310, preferably switches each one inputted optical packet over a wavelength having an available transmission resource selected from among wavelengths in one of the KG groups of wavelengths that is matched to the one inputted optical packet by correspondence of attributes of the at least one packet characteristic.

Preferably, the switch control unit 310 determines the KG groups of wavelengths, and the wavelength having the available transmission resource in the one of the KG groups of wavelengths for each one inputted optical packet. Alternatively, the switch control unit 310 may receive a determination of at least some of the KG groups of wavelengths from the processing unit. Then, based on the determination received from the processing unit, the switch control unit 310 may determine the rest of the KG groups of wavelengths and the wavelength having the available transmission resource in the one of the KG groups of wavelengths for each one inputted optical packet.

Preferably, grouping of the NW wavelengths into the KG groups of wavelengths, whether performed by the switch control unit 310 independently or in combination with the processing unit, may be performed dynamically based on changes in amounts of at least some of those of the inputted optical packets having the different attributes of the at least one packet characteristic. The changes may include, for example, changes in ratios of the amounts of the at least some of those of the inputted optical packets having the different attributes of the at least one packet characteristic.

Preferably, the changes may be determined prior to the grouping of the NW wavelengths into the KG groups of wavelengths, either by the management system 320 or by the switch control unit 310. It is appreciated that dynamic grouping of the NW wavelengths into the KG groups of wavelengths may result in changing of at least one of the following: group size of at least two of the KG groups; and KG.

For example, the NW wavelengths may be grouped into two groups of wavelengths (KG=2) during a first time period based on a difference in attributes of a specific packet characteristic of the inputted optical packets. One of the groups may be allocated to inputted optical packets having a first attribute of the specific packet characteristic, and the other group may be allocated to inputted optical packets having a second attribute of the specific packet characteristic.

Group size of each of the two groups may be determined, for example, according to an amount of inputted optical packets having the corresponding attribute of the specific packet characteristic during the first time period. As a result, the group allocated to inputted optical packets having the first attribute of the specific packet characteristic may include, for example, NW/3 wavelengths, and the other group may include, for example, 2*NW/3 wavelengths.

Then, if the amounts of inputted optical packets having the first and second attributes of the specific packet characteristic are expected to change during a second time period, the NW wavelengths may be regrouped before the second time period begins. Regrouping of the NW wavelengths may result, for example, in grouping of the NW wavelengths in two new groups of wavelengths in which each group includes, for example, NW/2 wavelengths. The two new groups of wavelengths may then be used during the second time period.

Preferably, selection of the wavelength having the available transmission resource from among the wavelengths in the one of the KG groups of wavelengths may be performed using any appropriate selection algorithm. For example, the selection algorithm may be an algorithm well known in the art such as, but not limited to, one of the following algorithms described in the above mentioned article of Callegati et al in *Optical Networks Magazine,* November/December 2001: the Horizon Channel Scheduling (HCS) algorithm; the void filling algorithm; the Round Robin (RR) algorithm; the minimum length queue (MINL) algorithm; and the minimum gap queue (MING) algorithm.

It is appreciated that an advantage of the present invention is that the selection algorithm is performed only on a subset of the NW wavelengths thereby reducing computation complexity with respect to computation complexity of the prior art techniques in which computation is performed on all NW wavelengths.

Once the wavelength having the available transmission resource is selected for an inputted optical packet, the switch control unit 310 preferably activates the switching node 300 to switch the inputted optical packet over the wavelength having the available transmission resource.

The at least one packet characteristic may preferably include a characteristic based on one of the following: delay sensitivity; optical packet bit-rate range; optical packet carrier wavelength band; optical packet carrier wavelength separation from other wavelengths; optical packet carrier wavelength priority; and optical packet service level.

In a case where the NW wavelengths are grouped into the KG groups of wavelengths according to different attributes of delay sensitivity of the inputted optical packets, two groups of wavelengths may typically be produced (KG=2) in which a first group is allocated to delay sensitive optical packets and a second group is allocated to delay insensitive optical packets. Then, those of the inputted optical packets that are delay sensitive are preferably switched only over wavelengths in the first group, and those of the inputted optical packets that are delay insensitive are preferably switched only over wavelengths in the second group. A higher number of wavelengths may, for example, be allocated to the delay sensitive optical packets than to the delay insensitive optical packets thereby increasing the probability of transmission without delay of the delay sensitive optical packets which results in improvement of quality-of-service (QoS).

It is appreciated that the first group may further be grouped into sub-groups allocated to inputted optical packets having specific sensitivity levels typically defining specific sensitivity delay ranges. Thus, grouping of the NW wavelengths into the KG groups of wavelengths according to different attributes of delay sensitivity may be hierarchical.

In a case where the NW wavelengths are grouped into the KG groups of wavelengths according to different attributes of a characteristic based on optical packet bit-rate range, each of the KG groups of wavelengths may preferably be allocated to optical packets at a single bit-rate range. For example, if the inputted optical packets include optical packets provided at a bit-rate of 2.5 Gigabit per second (Gb/s), optical packets provided at a bit-rate of 10 Gb/s and optical packets provided at a bit-rate of 40 Gb/s, the NW wavelengths may preferably be grouped into three groups of wavelengths (KG=3) in which the first group is allocated to optical packets at a bit-rate range around 2.5 Gb/s, the second group is allocated to optical packets at a bit-rate range around 10 Gb/s, and the third group is allocated to optical packets at a bit-rate range around 40 Gb/s.

Each inputted optical packet that is provided at a bit-rate of 2.5 Gb/s is then preferably switched over a wavelength selected from the first group. Similarly, each inputted optical packet that is provided at a bit-rate of 10 Gb/s is preferably switched over a wavelength selected from the second group, and each inputted optical packet that is provided at a bit-rate of 40 Gb/s is preferably switched over a wavelength selected from the third group. Ultimately, each of the NW wavelengths will carry optical packets provided at a single bit-rate and therefore cases in which a wavelength carries optical packets at more than one bit-rate range are avoided.

As mentioned in the parent U.S. patent application Ser. No. 09/944,603 which is incorporated herein by reference, if a wavelength carries optical packets at different bit-rates, the slower optical packets, even at small amounts, impede the faster optical packets thereby adversely affecting the overall transmission speed over the wavelength. Thus, avoidance of the cases in which a wavelength carries optical packets at more than one bit-rate range improves transmission efficiency.

In a case where the NW wavelengths are grouped into the KG groups of wavelengths according to different attributes of a characteristic based on optical packet carrier wavelength band, each of the KG groups may be allocated to optical packets that are provided at a single wavelength band. For example, the inputted optical packets may include optical packets in the C-Band and optical packets in the L-Band. In such a case, the NW wavelengths may preferably be grouped into two groups of wavelengths (KG=2) in which the first group is allocated to optical packets in the C-Band, and the second group is allocated to optical packets in the L-Band. Each inputted optical packet in the C-Band is then preferably switched over a wavelength selected from the first group and each inputted optical packet in the L-Band is preferably switched over a wavelength selected from the second group.

It is appreciated that grouping and allocation of wavelengths according to different attributes of a characteristic based on optical packet carrier wavelength band may be preferred, for example, in cases where wavelength conversion from one wavelength band to another wavelength band is not available or is limited. Confinement of wavelength conversion to wavelengths within the same wavelength band therefore prevents packet loss in such cases. Prevention of packet loss typically results in improvement of network reliability/survivability.

Alternatively or additionally, grouping and allocation of wavelengths according to different attributes of a characteristic based on optical packet carrier wavelength band may be preferred, for example, in a case where some wavelength bands experience interference of some type. In such a case, more optical packets may be directed to wavelength bands in which low levels of interference are experienced than to wavelength bands in which high levels of interference are experienced thereby increasing network reliability and survivability.

In a case where the NW wavelengths are grouped into the KG groups of wavelengths according to different attributes of a characteristic based on separation of optical packet carrier wavelength from other wavelengths, each of the KG groups may include wavelengths spaced apart a channel spacing of a similar magnitude. For example, if the NW wavelengths include six wavelengths $\lambda_1$=1526 nm, $\lambda_2$=1526.5 nm, $\lambda_3$=1527 nm, $\lambda_4$=1530 nm, $\lambda_5$=1532 nm, and $\lambda_6$=1534 nm, the NW wavelengths may be grouped into two groups of wavelengths (KG=2) in which the first group includes the wavelengths $\lambda_1$, $\lambda_2$ and $\lambda_3$ that are spaced 0.5 nm apart, and the second group includes the wavelengths $\lambda_4$, $\lambda_5$ and $\lambda_6$ that are spaced 2.0 nm apart.

It is appreciated that channel spacing is a parameter that may affect interference among channel wavelengths that may be caused, for example, by drifts over time in operating wavelengths of optical transmitters and optical receivers that may be generated, for example, due to temperature changes. Thus, communication over wavelengths whose separation from other wavelengths is 2 nm is bound to be more robust in terms of such interference than communication over wavelengths whose separation from other wavelengths is 0.5 nm. In a case where multiple service levels are supported, communication over $\lambda_4$, $\lambda_5$ and $\lambda_6$ may therefore be preferred for optical packets provided at the highest service level regardless of original wavelengths of such inputted optical packets.

In a case where the NW wavelengths are grouped into the KG groups of wavelengths according to different attributes of a characteristic based on optical packet carrier wavelength priority, each of the KG groups may include wavelengths having similar priorities. It is appreciated that wavelengths may be prioritized for each inputted optical packet according to various criterions.

For example, wavelengths may be prioritized in accordance with a wavelength conversion criterion. An optical packet may then be inputted to the switching node 300 over a wavelength $\lambda_1$, and the NW wavelengths may preferably include $\lambda_1$. In such a case, the NW wavelengths may be grouped into two groups of wavelengths (KG=2) in which a first group includes only $\lambda_1$ and a second group includes the rest of the NW−1 wavelengths. $\lambda_1$ may preferably be assigned a first priority and all the wavelengths in the second group may be assigned a second priority which is lower than the first priority.

If, for example, three wavelengths are found to have available transmission resources, and one of the three wavelengths is $\lambda_1$, then switching of the optical packet may preferably be carried over $\lambda_1$ which is the wavelength having the highest priority. It is appreciated that switching of the optical packet over $\lambda_1$ is advantageous because it does not require wavelength conversion.

Wavelengths may alternatively be prioritized in accordance with a criterion of susceptibility to a specific type of interference. For each inputted optical packet, the NW wavelengths may, for example, be grouped into two groups of wavelengths (KG=2) in which a first group includes wavelengths susceptible to the specific type of interference, and a second group includes wavelengths that are not susceptible to the specific type of interference. In such a case, if an optical packet is inputted to the switching node 300 over a wavelength susceptible to the specific type of interference, the optical packet may, for example, be switched over a wavelength in the second group.

Further alternatively, wavelengths may be prioritized in accordance with a criterion of actual congestion of optical packets. For each inputted optical packet, the NW wavelengths may, for example, be grouped into four groups of wavelengths (KG=4), each having a different level of congestion of previously switched optical packets. An inputted optical packet may then be switched over a wavelength having an available transmission resource in the least congested group of wavelengths although additional wavelengths having available transmission resources may be found in the other three groups of wavelengths.

In a case where the NW wavelengths are grouped into the KG groups of wavelengths according to different attributes of a characteristic based on optical packet service level, each of the KG groups of wavelengths may preferably be allocated to optical packets provided at a single service level. For example, the inputted optical packets may include inputted optical packets provided at a first service level and inputted optical packets provided at a second service level which is higher than the first service level.

In such a case, a determination of the first and second service levels may preferably be obtained and more wavelengths may preferably be allocated to inputted optical packets at the second service level than to inputted optical packets at the first service level. A network operator (not shown) may preferably allocate to the second group those of the NW wavelengths that provide best transmission conditions in terms of, for example, susceptibility to interference, separation from other wavelengths, wavelength band, and so forth.

It is appreciated that the NW wavelengths may be grouped into the KG groups of wavelengths in a non-hierarchical mode according to attributes of more than one packet characteristic, such as according to attributes of two packet characteristics. For example, the NW wavelengths may be grouped according to characteristics based on delay sensitivity and optical packet bit-rate range to provide, for example, four groups of wavelengths (KG=4) in which the first group is allocated to delay sensitive optical packets, the second group is allocated to delay insensitive optical packets, the third group is allocated to optical packets provided at a first bit-rate, and the fourth group is allocated to optical packets provided at a second bit-rate.

In accordance with another preferred embodiment of the present invention the at least one packet characteristic may preferably include a characteristic based on a hierarchical combination of at least two of the following: delay sensitivity; optical packet bit-rate range; optical packet carrier wavelength band; optical packet carrier wavelength separation from other wavelengths; optical packet carrier wavelength priority; and optical packet service level.

In such a case, the NW wavelengths may, for example, be grouped according to a characteristic based on a hierarchical combination of delay sensitivity and optical packet bit-rate range to provide, for example, four groups of wavelengths (KG=4) in which the first group is allocated to delay sensitive optical packets provided at a first bit-rate, the second group is allocated to delay sensitive optical packets provided at a second bit-rate, the third group is allocated to delay insensitive optical packets provided at the first bit-rate, and the fourth group is allocated to delay insensitive optical packets provided at the second bit-rate.

Preferably, regardless of packet characteristic, or hierarchical combination of packet characteristics, according to which the NW wavelengths are grouped, grouping of the NW wavelengths into the KG groups of wavelengths may be performed dynamically in a manner as mentioned above.

Alternatively, regardless of packet characteristic, or hierarchical combination of packet characteristics, according to which the NW wavelengths are grouped, grouping of the NW wavelengths into the KG groups of wavelengths may be assisted by the network operator that may determine, for example, constant group sizes or acceptable ranges of alteration of group sizes.

Preferably, each attribute of each packet characteristic mentioned above may be determined and obtained by analyzing, at the switch control unit 310 or the management system 320, a packet identifier. The packet identifier may preferably include, or be comprised in, at least one of the following: a source identifier; a label; and an overhead byte.

It is appreciated that grouping of the NW wavelengths into the KG groups of wavelengths, regardless of packet characteristic or hierarchical combination of packet characteristics according to which the NW wavelengths are grouped also leads to grouping of the inputted optical packets according to packet characteristics. Such grouping of the inputted optical packets may be used, for example, to enable performance of unique switching related operations on optical packets in selected groups.

For example, the NW wavelengths may be grouped into two groups of wavelengths (KG=2) according to different attributes of a selected packet characteristic such as, for example, a characteristic based on delay sensitivity or a characteristic based on optical packet carrier wavelength band. The first group may include, for example, the majority of the NW wavelengths in order to provide acceptable switching conditions to inputted optical packets that correspond to the first group.

In such a case, the second group may include an insufficient number of wavelengths thus creating a situation that may require dropping of some inputted optical packets that correspond to the second group. Preferably, rather than taking a risk of having to drop some inputted optical packets that correspond to the second group, some or all of the inputted optical packets that correspond to the second group may preferably be directed to an external optical packet switch (not shown). The external optical packet switch may preferably switch the inputted optical packets that correspond to the second group independently.

Other examples of unique switching related operations that may be performed on optical packets in selected groups include compacting of optical packets, and balancing of bit-rates of optical packets with respect to each other up to a bit-rate difference level. The compacting and balancing operations may preferably be performed when the NW wavelengths are grouped into the KG groups of wavelengths according to different attributes of a characteristic based on optical packet bit-rate range. Preferably, the compacting and balancing operations may be performed as mentioned in the parent U.S. patent application Ser. No. 09/944,603 that is incorporated herein by reference.

It is appreciated that in order to account for polarization directions over a wavelength as separate transmission resources, the contention resolution unit 330 must be able to use separable polarization directions over a wavelength for resolving bandwidth contention. Resolution of bandwidth contention by using separable polarization directions over a wavelength may be obtained by employing the polarizing apparatus and/or the method for resolving bandwidth contention that uses polarization as mentioned in the parent U.S. patent application Ser. No. 09/944,603.

In FIG. 4 hierarchical grouping of NW=32 wavelengths into four groups of wavelengths (KG=4) for an inputted optical packet OP is depicted by way of example. The four groups of wavelengths include, by way of example, a first group (GROUP1) that includes eight wavelengths $\lambda_1$–$\lambda_8$, a second group (GROUP2) that includes sixteen wavelengths $\lambda_9$–$\lambda_{24}$, a third group (GROUP3) that includes five wavelengths $\lambda_{25}$–$\lambda_{29}$, and a fourth group (GROUP4) that includes three wavelengths $\lambda_{30}$–$\lambda_{32}$. GROUP1 is allocated to delay sensitive optical packets at 2.5 Gb/s and GROUP 2 is allocated to delay sensitive optical packets at 10 Gb/s.

GROUP3 is allocated to delay insensitive optical packets at 10 Gb/s and GROUP4 is allocated to delay insensitive optical packets at 2.5 Gb/s.

By way of example, OP is a delay sensitive optical packet at 10 Gb/s inputted to the switching node 300 over $\lambda_1$. The switching node 300, under control of the switch control unit 310, then switches OP over $\lambda_{10}$ which is a wavelength having an available transmission resource in GROUP2.

It is appreciated that the switch control unit 310 and the processing unit in the management system 320 in combination form in fact a wavelength allocation apparatus or a scheduler. The processing unit in the wavelength allocation apparatus may, for example, group the NW wavelengths into the KG groups of wavelengths. The switch control unit 310 in the wavelength allocation apparatus may, for example, find one of the KG groups of wavelengths that matches an inputted optical packet by correspondence of attributes of packet characteristics, and select, from among wavelengths in the one of the KG groups of wavelengths, a wavelength having an available transmission resource as an output wavelength over which to output the inputted optical packet.

Figure 5:
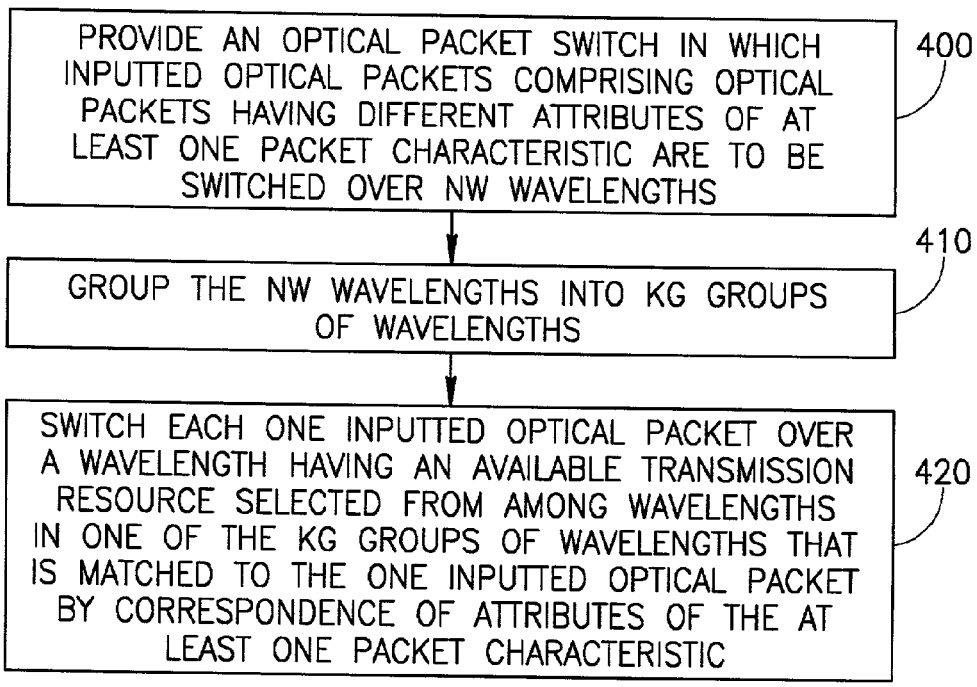
FIG. 5 is a simplified flowchart illustration of a preferred method of operation of the apparatus of FIGS. 1–3.

Reference is now made to FIG. 5 which is a simplified flowchart illustration of a preferred method of operation of the apparatus of FIGS. 1–3.

An optical packet switch in which inputted optical packets comprising optical packets having different attributes of at least one packet characteristic are to be switched over NW wavelengths is preferably provided (step 400), where NW is an integer greater than one.

Preferably, the NW wavelengths are grouped into KG groups of wavelengths (step 410) characterized in that each of the KG groups of wavelengths is allocated to optical packets distinguished from other optical packets by at least one attribute of the at least one packet characteristic, where KG is an integer greater than one. It is appreciated that grouping of the NW wavelengths into the KG groups of wavelengths may be performed dynamically based on changes in amounts of at least some of those of the inputted optical packets having the different attributes of the at least one packet characteristic. The changes may preferably be determined prior to grouping of the NW wavelengths into the KG groups of wavelengths. It is appreciated that dynamic grouping of the NW wavelengths into the KG groups of wavelengths may result in changing of at least one of the following: group size of at least two of the KG groups; and KG.

Once the NW wavelengths are grouped into the KG groups of wavelengths, each one inputted optical packet is preferably switched over a wavelength having an available transmission resource (step 420) selected from among wavelengths in one of the KG groups of wavelengths that is matched to the one inputted optical packet by correspondence of attributes of the at least one packet characteristic.

The at least one packet characteristic may preferably include a characteristic based on one of the following: delay sensitivity; optical packet bit-rate range; optical packet carrier wavelength band; optical packet carrier wavelength separation from other wavelengths; optical packet carrier wavelength priority; and optical packet service level. Alternatively, the at least one packet characteristic may be based on a hierarchical or non-hierarchical combination of at least two of the following: delay sensitivity; optical packet bit-rate range; optical packet carrier wavelength band; optical packet carrier wavelength separation from other wavelengths; optical packet carrier wavelength priority; and optical packet service level.

Figure 6:
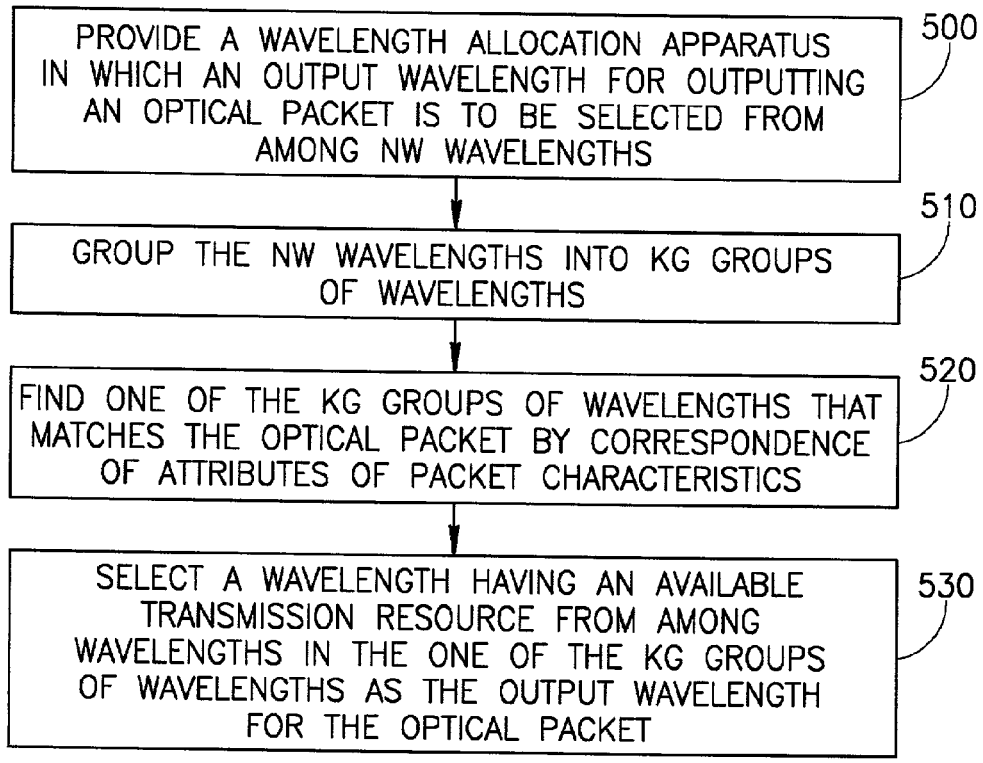
FIG. 6 is a simplified flowchart illustration of another preferred method of operation of the apparatus of FIGS. 1–3.

Reference is now made to FIG. 6 which is a simplified flowchart illustration of another preferred method of operation of the apparatus of FIGS. 1–3.

A wavelength allocation apparatus in which an output wavelength for outputting an optical packet is to be selected from among NW wavelengths is preferably provided (step 500), where NW is an integer greater than one.

Preferably, the NW wavelengths are grouped into KG groups of wavelengths (step 510) characterized in that each of the KG groups of wavelengths is allocated to optical packets distinguished from other optical packets by at least one attribute of at least one packet characteristic, where KG is an integer greater than one. One of the KG groups of wavelengths that matches the optical packet by correspondence of attributes of the at least one packet characteristic is then preferably found (step 520). Then, a wavelength having an available transmission resource is selected (step 530) from among wavelengths in the one of the KG groups of wavelengths as the output wavelength for the optical packet.

It is appreciated that various features of the invention that are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow.

What is claimed is:

1. An optical packet switching method for switching inputted optical packets over NW wavelengths, the inputted optical packets comprising optical packets having different attributes of a characteristic based on delay sensitivity, the optical packets having different attributes of a characteristic based on delay sensitivity also comprise optical packets having different attributes of a characteristic based on optical packet bit-rate range, and NW is an integer greater than one, the method comprising:

grouping the NW wavelengths into KG groups of wavelengths both according to the different attributes of the characteristic based on delay sensitivity and according to the different attributes of the characteristic based on optical packet bit-rate range so that each of the KG groups of wavelengths is allocated to optical packets having both a common delay sensitivity level and a common bit-rate range which are different from at least one of the following: a delay sensitivity level of other optical packets; and a bit-rate range of other optical packets, where KG is an integer greater than one; and switching each one inputted optical packet over a wavelength having an available transmission resource selected from among wavelengths in one of said KG groups of wavelengths that is matched to the one inputted optical packet by correspondence of both a delay sensitivity level and a bit-rate range.

2. The method according to claim 1 and wherein said grouping comprises allocating more wavelengths to delay sensitive optical packets than to delay insensitive optical packets.

3. The method according to claim 1 and wherein the inputted optical packets comprise Internet Protocol (IP) packets.

4. The method according to claim 3 and wherein the IP packets comprise IP packets that are produced in at least one of the following: an IP-over-WDM network; an Ethernet based network; an IP-over-SDH-over-WDM (IPoSDHoWDM) network; an IP-over-SONET-over-WDM (IPoSONEToWDM) network; and an IP-over-ATM-over-WDM (IPoATMoWDM) network.

5. The method according to claim 1 and wherein:
the optical packets having different attributes of a characteristic based on delay sensitivity also comprise optical packets having different attributes of a characteristic based on optical packet service level;
the grouping comprises grouping the NW wavelengths into KG groups of wavelengths according to the different attributes of the characteristic based on delay sensitivity, according to the different attributes of the characteristic based on optical packet bit-rate range, and according to the different attributes of the characteristic based on optical packet service level so that each of the KG groups of wavelengths is allocated to optical packets having a common delay sensitivity level, a common bit-rate range, and a common service level which are different from at least one of the following: a delay sensitivity level of other optical packets; a bit-rate range of other optical packets; and a service level of other optical packets; and
the switching comprises switching each one inputted optical packet over a wavelength having an available transmission resource selected from among wavelengths in one of said KG groups of wavelengths that is matched to the one inputted optical packet by correspondence of a delay sensitivity level, a bit-rate range, and an optical packet service level.

6. An optical packet switching method for switching inputted optical packets over NW wavelengths, the inputted optical packets comprising optical packets having different attributes of a characteristic based on optical packet carrier wavelength band, where NW is an integer greater than one, the method comprising:
directing more of the inputted optical packets to a first wavelength band that experiences a first level of interference than to a second wavelength band that experiences a second level of interference which is higher than the first level of interference;
grouping the NW wavelengths into KG groups of wavelengths according to the different attributes of the characteristic based on optical packet carrier wavelength band so that each of the KG groups of wavelengths is allocated to optical packets that are provided at a common wavelength band which is different from a wavelength band of other optical packets, where the common wavelength band comprises a plurality of separate optical channels and KG is an integer greater than one; and
switching each one inputted optical packet over a wavelength having an available transmission resource selected from among wavelengths in one of said KG groups of wavelengths that is matched to the one inputted optical packet by correspondence of a wavelength band.

7. The method according to claim 6 and wherein the common wavelength band comprises a wavelength band of an order of magnitude of tens nanometers (nm) around one of the following wavelengths: 780 nm; 980 nm; 1310 nm; 1480 nm; 1510 nm; 1550 nm; and 1620 nm.

8. The method according to claim 6 and wherein the common wavelength band comprises one of the following wavelength bands: 1488–1518 nm (the S-Band); 1526–1563 nm (the C-Band); and 1569–1613 nm (the L-Band).

9. The method according to claim 6 and wherein the inputted optical packets comprise Internet Protocol (IP) packets.

10. The method according to claim 9 and wherein the IP packets comprise IP packets that are produced in at least one of the following: an IP-over-WDM network; an Ethernet based network; an IP-over-SDH-over-WDM (IPoSDHoWDM) network; an IP-over-SONET-over-WDM (IPoSONEToWDM) network; and an IP-over-ATM-over-WDM (IPoATMoWDM) network.

11. An optical packet switching method for switching inputted optical packets over NW wavelengths, the inputted optical packets comprising optical packets having different attributes of a characteristic based on optical packet carrier wavelength priority, where NW is an integer greater than one, the method comprising:
grouping the NW wavelengths into KG groups of wavelengths according to the different attributes of the characteristic based on optical packet carrier wavelength priority so that each of the KG groups of wavelengths comprises wavelengths having a common priority which is different from a priority of wavelengths in other groups, where KG is an integer greater than one and the common priority comprises a priority with respect to susceptibility to interference; and
switching each one inputted optical packet over a wavelength having an available transmission resource selected from among wavelengths in one of said KG groups of wavelengths that is matched to the one inputted optical packet by correspondence of an attribute of the characteristic based on optical packet carrier wavelength priority.

12. The method according to claim 11 and wherein the inputted optical packets comprise Internet Protocol (IP) packets.

13. The method according to claim 12 and wherein the IP packets comprise IP packets that are produced in at least one of the following: an IP-over-WDM network; an Ethernet based network; an IP-over-SDH-over-WDM (IPoSDHoWDM) network; an IP-over-SONET-over-WDM (IPoSONEToWDM) network; and an IP-over-ATM-over-WDM (IPoATMoWDM) network.

14. An optical packet switching method for switching inputted optical packets over NW wavelengths, the inputted optical packets comprising optical packets having different attributes of a characteristic based on optical packet service level, where NW is an integer greater than one, the method comprising:
grouping the NW wavelengths into KG groups of wavelengths according to the different attributes of the characteristic based on optical packet service level so that each of the KG groups of wavelengths is allocated to optical packets provided at a common service level which is different from a service level of other optical packets, where KG is an integer greater than one and the grouping comprises allocating wavelengths which provide different transmission conditions to inputted optical packets provided at different service levels, the different transmission conditions comprising transmission conditions in terms of at least one of the following: susceptibility to interference; and separation from other wavelengths; and
switching each one inputted optical packet over a wavelength having an available transmission resource selected from among wavelengths in one of said KG groups of wavelengths that is matched to the one inputted optical packet by correspondence of an optical packet service level.

15. The method according to claim 14 and wherein said grouping comprises allocating a different number of wavelengths to inputted optical packets provided at different service levels.

16. The method according to claim 14 and wherein the inputted optical packets comprise Internet Protocol (IP) packets.

17. The method according to claim 16 and wherein the IP packets comprise IP packets that are produced in at least one of the following: an IP-over-WDM network; an Ethernet based network; an IP-over-SDH-over-WDM (IPoSDHoWDM) network; an IP-over-SONET-over-WDM (IPoSONEToWDM) network; and an IP-over-ATM-over-WDM (IPoATMoWDM) network.

18. An optical packet switch for switching inputted optical packets over NW wavelengths, the inputted optical packets comprising optical packets having different attributes of a characteristic based on delay sensitivity, the optical packets having different attributes of a characteristic based on delay sensitivity also comprise optical packets having different attributes of a characteristic based on optical packet bit-rate range, and NW is an integer greater than one, the optical packet switch comprising:
a switching fabric; and
a switching/routing control unit operatively associated with the switching fabric and operative to control the switching fabric for switching each one inputted optical packet over a wavelength having an available transmission resource selected from among wavelengths in one of KG groups of wavelengths, where KG is an integer greater than one, the KG groups of wavelengths are formed by grouping the NW wavelengths both according to the different attributes of the characteristic based on delay sensitivity and according to the different attributes of the characteristic based on optical packet bit-rate range so that each of the KG groups of wavelengths is allocated to optical packets having both a common delay sensitivity level and a common bit-rate range which are different from at least one of the following: a delay sensitivity level of other optical packets; and a bit-rate range of other optical packets, and said one of KG groups of wavelengths is matched to the one inputted optical packet by correspondence of both a delay sensitivity level and a bit-rate range.

19. An optical packet switch for switching inputted optical packets over NW wavelengths, the inputted optical packets comprising optical packets having different attributes of a characteristic based on optical packet carrier wavelength band, where NW is an integer greater than one, the optical packet switch comprising:
a switching fabric; and
a switching/routing control unit operatively associated with the switching fabric and operative to control the switching fabric for directing more of the inputted optical packets to a first wavelength band that experiences a first level of interference than to a second wavelength band that experiences a second level of interference which is higher than the first level of interference and for switching each one inputted optical packet over a wavelength having an available transmission resource selected from among wavelengths in one of KG groups of wavelengths, where KG is an integer greater than one, the KG groups of wavelengths are formed by grouping the NW wavelengths according to the different attributes of the characteristic based on optical packet carrier wavelength band so that each of the KG groups of wavelengths is allocated to optical packets that are provided at a common wavelength band which is different from a wavelength band of other optical packets, the common wavelength band comprising a plurality of separate optical channels, and said one of KG groups of wavelengths is matched to the one inputted optical packet by correspondence of a wavelength band.

20. An optical packet switch for switching inputted optical packets over NW wavelengths, the inputted optical packets comprising optical packets having different attributes of a characteristic based on optical packet carrier wavelength priority, where NW is an integer greater than one, the optical packet switch comprising:
a switching fabric; and
a switching/routing control unit operatively associated with the switching fabric and operative to control the switching fabric for switching each one inputted optical packet over a wavelength having an available transmission resource selected from among wavelengths in one of KG groups of wavelengths, where KG is an integer greater than one, the KG groups of wavelengths are formed by grouping the NW wavelengths according to the different attributes of the characteristic based on optical packet carrier wavelength priority so that each of the KG groups of wavelengths comprises wavelengths having a common priority which is different from a priority of wavelengths in other groups, said common priority comprising a priority with respect to susceptibility to interference, and said one of KG groups of wavelengths is matched to the one inputted optical packet by correspondence of an attribute of the characteristic based on optical packet carrier wavelength priority.

21. An optical packet switch for switching inputted optical packets over NW wavelengths, the inputted optical packets comprising optical packets having different attributes of a characteristic based on optical packet service level, where NW is an integer greater than one, the optical packet switch comprising:
a switching fabric; and
a switching/routing control unit operatively associated with the switching fabric and operative to control the switching fabric for switching each one inputted optical packet over a wavelength having an available transmission resource selected from among wavelengths in one of KG groups of wavelengths, where KG is an integer greater than one, the KG groups of wavelengths are formed by grouping the NW wavelengths according to the different attributes of the characteristic based on optical packet service level so that each of the KG groups of wavelengths is allocated to optical packets provided at a common service level which is different from a service level of other optical packets, the grouping comprises allocating wavelengths which provide different transmission conditions to inputted optical packets provided at different service levels, the different transmission conditions comprising transmission conditions in terms of at least one of the following: susceptibility to interference; and separation from other wavelengths, and said one of KG groups of wavelengths is matched to the one inputted optical packet by correspondence of an optical packet service level.

* * * * *